US010838277B2

(12) United States Patent
Yoshida

(10) Patent No.: US 10,838,277 B2
(45) Date of Patent: Nov. 17, 2020

(54) IMAGE DISPLAY DEVICE WITH FRAME REGION TRANSISTOR CONTROL LINE INCLUDING STACKED LINE LAYERS

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/562,491

(22) Filed: Sep. 6, 2019

(65) Prior Publication Data
US 2020/0081308 A1 Mar. 12, 2020

Related U.S. Application Data

(60) Provisional application No. 62/730,021, filed on Sep. 12, 2018.

(51) Int. Cl.
*G02F 1/1362* (2006.01)
*G02F 1/133* (2006.01)
*G02F 1/1333* (2006.01)
*G06F 3/041* (2006.01)

(52) U.S. Cl.
CPC .... *G02F 1/136286* (2013.01); *G02F 1/13306* (2013.01); *G02F 1/13338* (2013.01); *G02F 1/133308* (2013.01); *G06F 3/0412* (2013.01); *G06F 3/0416* (2013.01); *G02F 2001/13629* (2013.01)

(58) Field of Classification Search
CPC ....... G06F 3/041–047; G02F 1/136286; G02F 1/13306; G02F 1/13338; G02F 1/133308; G02F 2001/13629; G09G 3/36–3696
See application file for complete search history.

(56) References Cited

U.S. PATENT DOCUMENTS

| 9,024,913 | B1 | 5/2015 | Jung et al. | |
|---|---|---|---|---|
| 10,152,159 | B2* | 12/2018 | Cao | H01L 51/5203 |
| 10,613,660 | B2* | 4/2020 | Kang | G06F 3/044 |
| 10,727,282 | B2* | 7/2020 | Kim | H01L 51/5203 |
| 2013/0141343 | A1* | 6/2013 | Yu | G06F 3/044 345/173 |
| 2014/0118277 | A1* | 5/2014 | Kim | G06F 3/044 345/173 |
| 2016/0246427 | A1* | 8/2016 | Ming | G06F 3/0412 |
| 2016/0293631 | A1* | 10/2016 | Sun | G06F 3/0412 |
| 2017/0176830 | A1* | 6/2017 | Yoshida | G02F 1/134336 |

FOREIGN PATENT DOCUMENTS

JP 2015-210811 A 11/2015

* cited by examiner

*Primary Examiner* — Gene W Lee
(74) *Attorney, Agent, or Firm* — Keating & Bennett, LLP

(57) ABSTRACT

The present invention provides an image display device which includes a substrate; a display region; and a frame region. The substrate includes a first line layer, a second line layer, and a third line layer; thin-film transistors disposed in the frame region; a control line disposed in the frame region and connected to a gate electrode of each of the thin-film transistors; a common signal line disposed in the frame region and connected to one of a source electrode or a drain electrode of each of the thin-film transistors; and conductive lines each connected to the other of each of the thin-film transistors and extending from the frame region into the display region. The control line includes a first control line portion in the first line layer, a second control line portion in the second line layer, and a third control line portion in the third line layer.

9 Claims, 18 Drawing Sheets

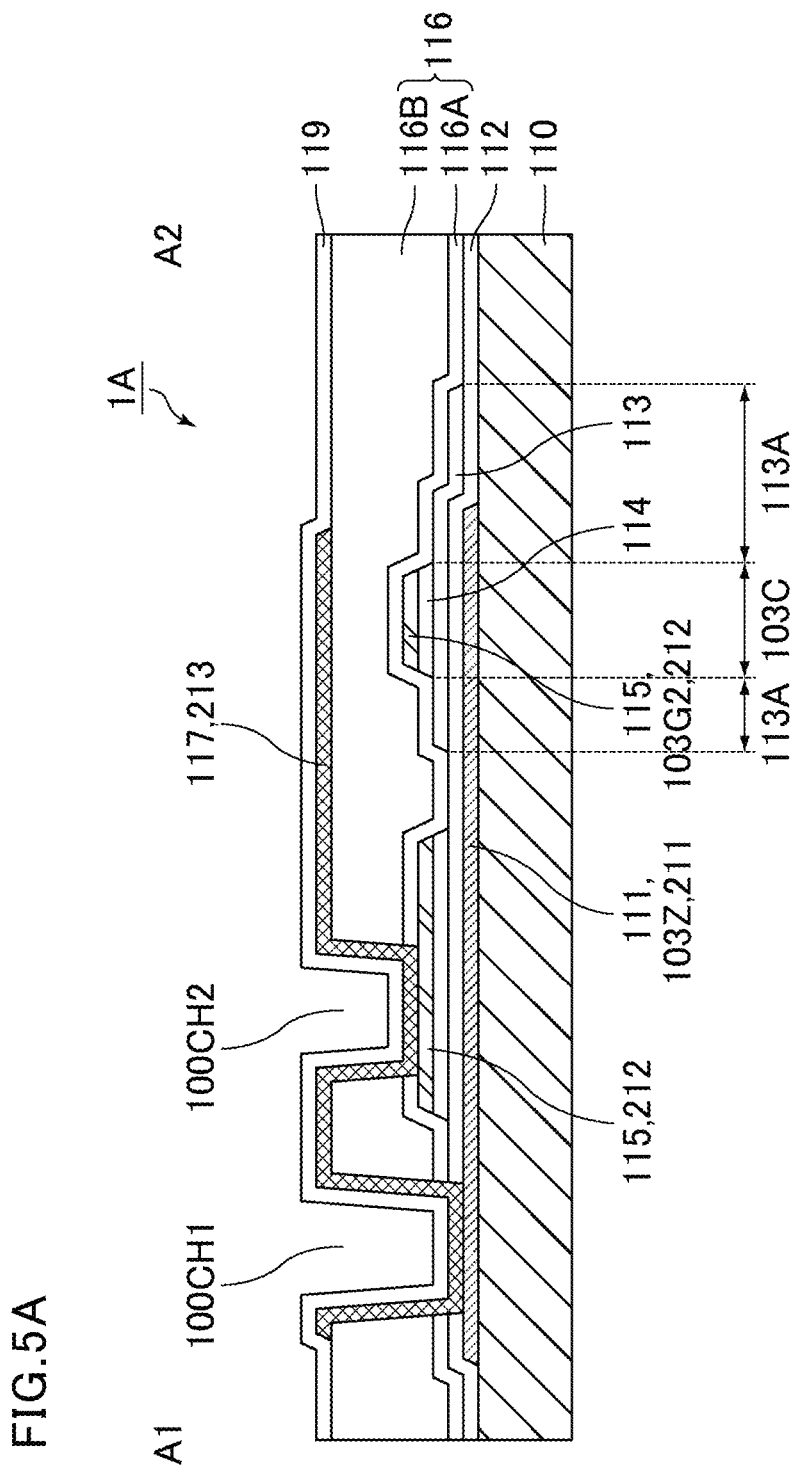

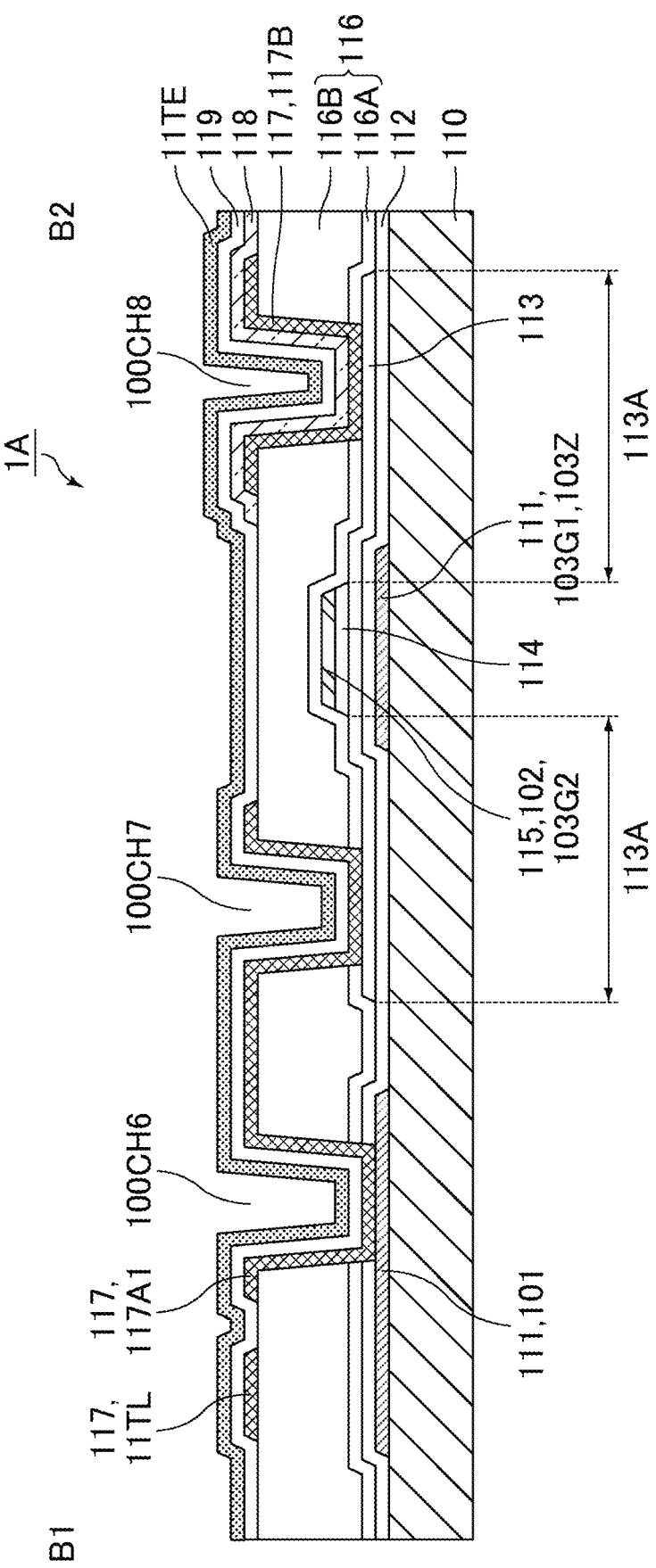

Display region side

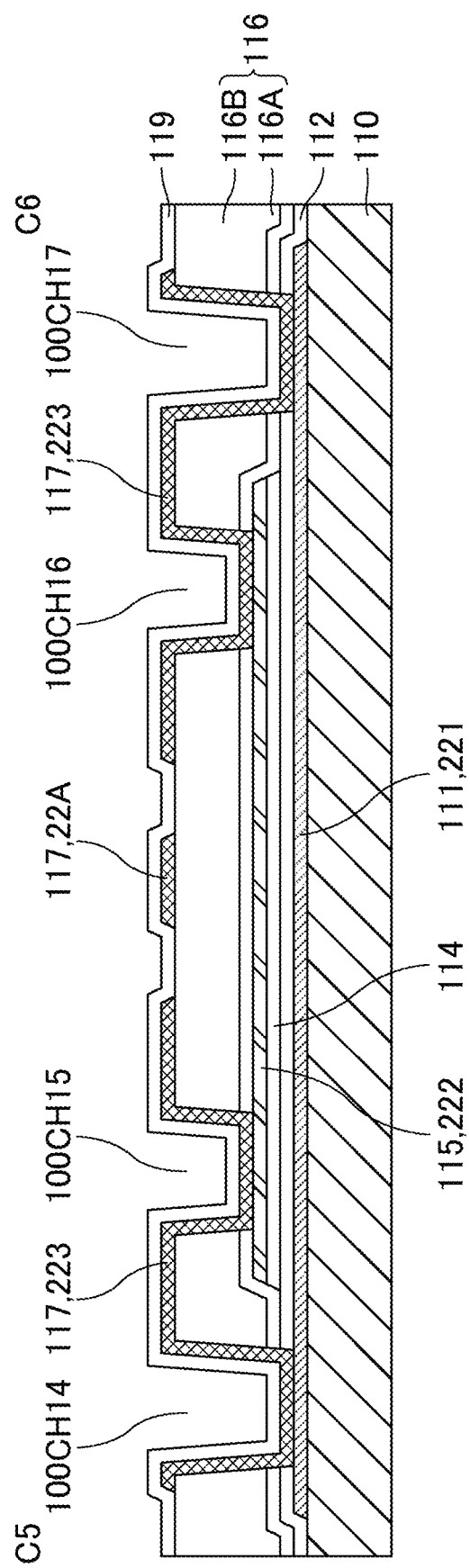

IMAGE DISPLAY DEVICE WITH FRAME REGION TRANSISTOR CONTROL LINE INCLUDING STACKED LINE LAYERS

CROSS-REFERENCE TO RELATED APPLICATIONS

The present application claims priority under 35 U.S.C. § 119 to U.S. Provisional Patent Application No. 62/730,021 filed on Sep. 12, 2018, the contents of which are incorporated herein by reference in their entirety.

BACKGROUND OF THE INVENTION

Field of the Invention

The present invention relates to image display devices. More specifically, the present invention relates to an image display device including thin-film transistors in a frame region.

Description of Related Art

Image display devices such as liquid crystal display devices typically include a thin-film transistor substrate (hereinafter, also abbreviated to TFT substrate) including many thin-film transistors (hereinafter, also abbreviated to TFTs). Some recent image display devices including a TFT substrate are equipped with an in-cell touch panel which is a display panel having a touch panel function.

Regarding an image display device including an in-cell touch panel, for example, JP 2015-210811 A discloses a touch sensing device that includes signal lines connected to pixels, sensor lines connected to touch sensors, a first feeding unit that supplies a common voltage to an end of each of the sensor lines during a display driving period and supplies a touch driving signal to the end of each of the sensor lines during a touch sensor driving period, and a second feeding unit that is connected to the sensor lines, causes short circuit of the touch sensors, and supplies the common voltage to the other end of each of the sensor lines during the display driving period, wherein the second feeding unit isolates the sensor lines during the touch sensor driving period.

BRIEF SUMMARY OF THE INVENTION

In an image display device including an in-cell touch panel, the electrodes disposed in the pixels of the display panel are also used as touch panel (hereinafter, also abbreviated to TP) electrodes. For example, the common electrode to apply a common voltage to the pixels is divided into segments. The electrode segments can function as a common electrode during a writing period for writing a display signal, which is a signal for displaying, to the pixels, and can function as TP electrodes during a sensing period for detecting at least one of contact or proximity of a pointer with a display region.

In the image display device including an in-cell touch panel, the writing period for writing a display signal to the pixels and the sensing period of the touch sensor are provided separately. During the transition period from the sensing period to the writing period, the degree of reaching the predetermined value varies from one TP electrode to another depending on their positions. Also during the writing period, the potentials of the TP electrodes may fluctuate due to the parasitic capacitance formed between the TP electrodes and data lines or other components.

The reason for this is that signals are supplied from the driver (which may be a driver for both data signals and touch sensors) to the TP electrodes through the touch sensor lines (also referred to as TP lines), and the TP lines having different lengths (i.e., the TP electrodes at different positions) cause different signal attenuation (loads). In the case where the image display device is a liquid crystal display device, the TP electrodes are formed, for example, by dividing the common electrode in the display region of a fringe field switching (FFS) mode liquid crystal display device into quadrilateral individual electrodes (segments) each having sides of about 2 mm to 6 mm.

In this structure, display defects (e.g., uneven brightness in the form of blocks for each segment) tend to occur particularly at a position far from the driver mounting portion.

FIG. 14 is a schematic plan view of a liquid crystal display device of Comparative Embodiment 1. FIG. 15 is an enlarged schematic plan view of the region surrounded by the dashed line in FIG. 14. A liquid crystal display device 1R of Comparative Embodiment 1 shown in FIG. 14 includes a TFT substrate 1AR, a counter substrate 1BR facing the TFT substrate 1AR, and a liquid crystal layer (not shown) between the TFT substrate 1AR and the counter substrate 1BR. The liquid crystal display device 1R of Comparative Embodiment 1 includes a display region AAR for displaying an image and a frame region NAR which is a peripheral region of the display region AAR. In the display region AAR are disposed TP electrodes 11TER and TP lines 11TLR connected to the TP electrodes 11TER. The TP electrodes 11TER can also be used as a common electrode. The lower area of the frame region NAR shown in FIG. 14 is provided with a driver 12R for both data signals and touch sensors, connected to the TP lines 11TLR, and a flexible printed circuit board (hereinafter, abbreviated to FPC) 13R. Each of the right and left areas of the frame region NAR shown in FIG. 14 is provided with a monolithic gate drive circuit 14R that supplies a scanning signal to the gate lines 102R. The upper area of the frame region NAR shown in FIG. 14 is provided with peripheral TFTs 103NR, and a control line 21R and a common signal line 22R each connected to terminals disposed on the FPC 13R. The control line 21R is connected to the gate electrode of each peripheral TFT 103NR, the common signal line 22R is connected to one of the source electrode or the drain electrode of each peripheral TFT 103NR, and each TP line 11TLR is connected to the other of the source electrode or the drain electrode of the corresponding peripheral TFT 103NR.

A structure of Comparative Embodiment 1 in which a common signal is supplied through the peripheral TFTs 103NR from the side opposite to the side (driver mounting side) from which a signal is supplied to the TP electrodes 11TER may be considered to solve the above-described display defects However, the liquid crystal display device 1R of Comparative Embodiment 1 needs to have a region where the control line 21R that controls the on and off states of the peripheral TFTs 103NR and the common signal line 22R are disposed, and thus needs to have a region on which these lines are to be routed. In particular, the control line 21R needs to input a signal that controls the peripheral TFTs 103NR during the transition period from the sensing period to the writing period (e.g., few microseconds to few tens of microseconds). Thus, the control line 21R is desired to have a low resistance and tends to have a thick width. Therefore, the liquid crystal display device 1R of Comparative Embodiment 1 is difficult to have a reduced frame region.

The touch sensing device disclosed in JP 2015-210811 A has an in-cell touch panel structure. This device is also difficult to have a reduced frame region for the same reason as in Comparative Embodiment 1.

In particular, a structure including a driver and a FPC in only one side area of the frame region or a structure including a gate drive circuit monolithically formed (gate driver monolithic, hereinafter, also abbreviated to GDM) on the TFT substrate is difficult to have a reduced frame region in the left and right areas of the frame region.

The present invention was made in view of the current state of the art, and an object of the present invention is to provide an image display device with a reduced frame region.

(1) One embodiment of the present invention is directed to an image display device including a substrate; a display region for displaying an image; and a frame region which is a peripheral region of the display region, the substrate including: an insulating substrate; on the insulating substrate, a stack sequentially including a first line layer, a first insulating film, a semiconductor layer, a second insulating film, a second line layer, a third insulating film, and a third line layer; thin-film transistors disposed in the frame region; a control line disposed in the frame region and connected to a gate electrode of each of the thin-film transistors; a common signal line disposed in the frame region and connected to one of a source electrode or a drain electrode of each of the thin-film transistors; and conductive lines each connected to the other of the source electrode or the drain electrode of each of the thin-film transistors and extending from the frame region into the display region, the control line including a first control line portion in the first line layer, a second control line portion in the second line layer, and a third control line portion in the third line layer.

(2) In an embodiment of the present invention, the image display device includes the structure (1), and the first control line portion and the second control line portion are connected to each other via the third control line portion.

(3) In an embodiment of the present invention, the image display device includes the structure (2), and the control line is located to intersect extended lines of the conductive lines, the first control line portion and the second control line portion are connected to each other via the third control line portion at two or more positions in a region between two extended lines of two adjacent conductive lines.

(4) In an embodiment of the present invention, the image display device includes the structure (1), (2), or (3), and the thin-film transistors each further includes a channel light-shielding film in the first line layer, and the gate electrode is in the second line layer.

(5) In an embodiment of the present invention, the image display device includes the structure (1), (2), (3), or (4), and the substrate further includes: thin-film transistors in the display region; and gate lines each connected to a gate electrode of each thin-film transistor in the display region, and the conductive lines intersect the gate lines in the display region.

(6) In an embodiment of the present invention, the image display device includes the structure (5), and the conductive lines are data lines each connected to one of a source electrode or a drain electrode of each of the thin-film transistors in the display region, the substrate further includes pixel electrodes, and the pixel electrodes are each connected to the other of the source electrode or the drain electrode of each of the thin-film transistors in the display region.

(7) In an embodiment of the present invention, the image display device includes the structure (5), and the substrate further includes touch panel electrodes in the display region, the conductive lines are touch panel lines each connected to any of the touch panel electrodes, during a writing period for writing a display signal to pixels in the display region, the thin-film transistors in the frame region are turned on, and a signal is supplied to each conductive line from each end of the conductive line, and during a sensing period for detecting at least one of contact or proximity of a pointer with the display region, the thin-film transistors in the frame region are turned off, and a signal is supplied to each conductive line from an end of the conductive line, the end being not connected to any of the thin-film transistors in the frame region.

(8) In an embodiment of the present invention, the image display device includes the structure (1), (2), (3), (4), (5), (6), or (7), and the common signal line includes a first common signal line portion in the first line layer, a second common signal line portion in the second line layer, and a third common signal line portion in the third line layer.

(9) In an embodiment of the present invention, the image display device includes the structure (8), and the first common signal line portion and the second common signal line portion are connected to each other via the third common signal line portion.

(10) In an embodiment of the present invention, the image display device includes the structure (8), and the substrate includes a plurality of the common signal lines, the common signal lines are parallel to each other in a region farther from the display region than the thin-film transistors in the frame region, the thin-film transistors in the frame region are each connected to any of the common signal lines, the common signal lines include a common signal line closest to the display region and at least one common signal line having branch lines, each of the branch lines intersecting one or more common signal lines closer to the display region than the common signal line from which the branch lines extend, and the branch lines are each connected to any of the thin-film transistors in the frame region.

(11) In an embodiment of the present invention, the image display device includes the structure (10), and the branch lines are in the third line layer, the third common signal line portion in each of the one or more common signal lines intersecting the branch lines is disposed in a region between two adjacent branch lines, the first common signal line portion and the second common signal line portion in each of the one or more common signal lines intersecting the branch lines are connected to each other via the third common signal line portion at each end portion of the third common signal line portion.

The present invention can provide an image display device with a reduced frame region.

BRIEF DESCRIPTION OF THE DRAWINGS

FIG. 5A is a schematic cross-sectional view of a TFT substrate in the liquid crystal display device of Embodiment 1.

FIG. 7A is yet another schematic cross-sectional view of the TFT substrate in the liquid crystal display device of Embodiment 1.

FIG. 11C is yet another schematic cross-sectional view of the TFT substrate in the liquid crystal display device of Embodiment 2.

DETAILED DESCRIPTION OF THE INVENTION

Figure 1:
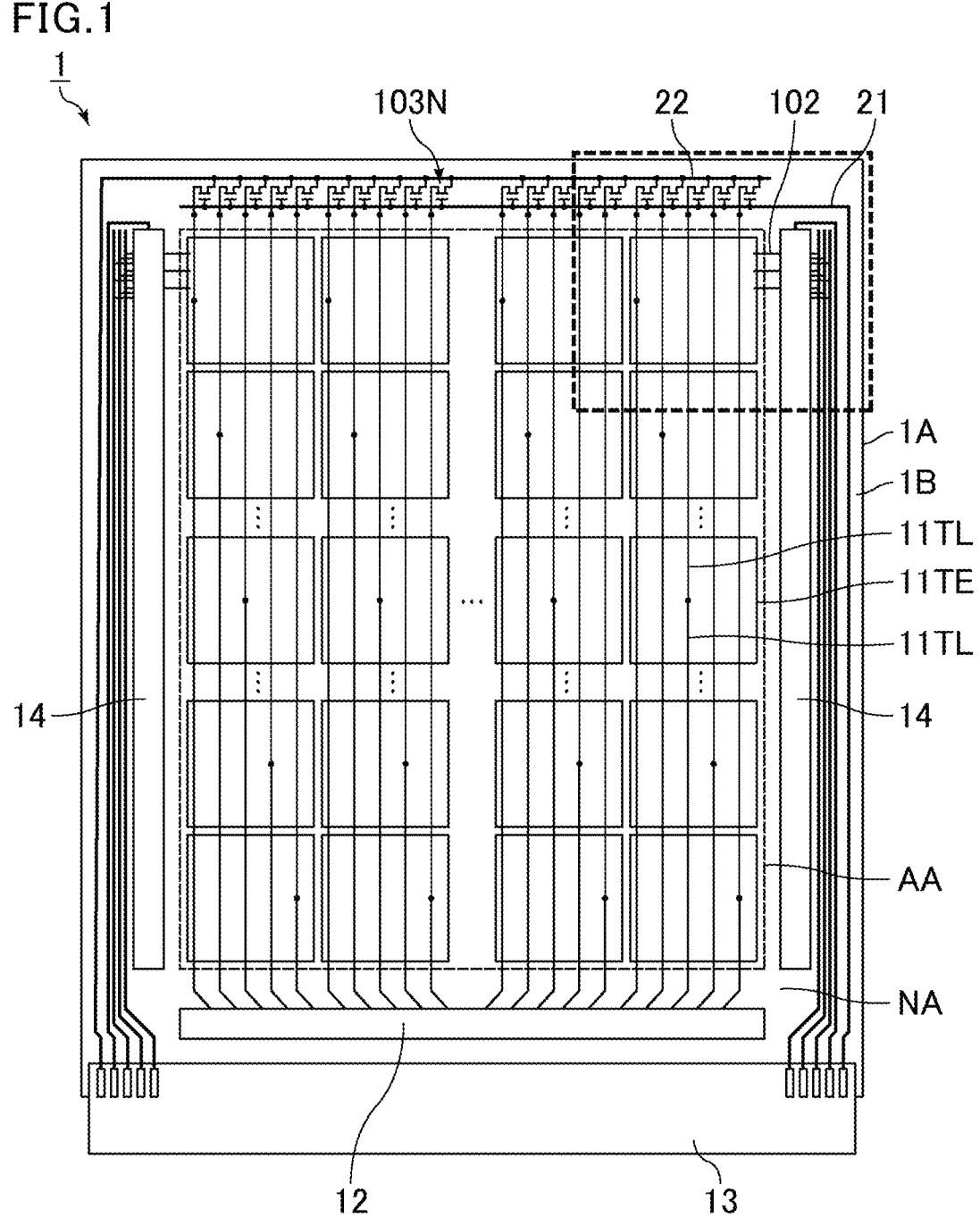
FIG. 1 is a schematic plan view of a liquid crystal display device of Embodiment 1.

Hereinafter, image display devices of embodiments of the present invention are described. The embodiments are not intended to limit the scope of the present invention. The design may be modified as appropriate within the range satisfying the configuration of the present invention. The configurations in the embodiments may appropriately be combined or modified within the spirit of the present invention.

The image display devices of embodiments of the present invention each include a substrate, a display region for displaying an image, and a frame region which is a peripheral region of the display region. The substrate includes an insulating substrate; on the insulating substrate, a stack sequentially including a first line layer, a first insulating film, a semiconductor layer, a second insulating film, a second line layer, a third insulating film, and a third line layer; thin-film transistors (hereinafter, also referred to as TFTs) disposed in the frame region; a control line disposed in the frame region and connected to a gate electrode of each of the thin-film transistors; a common signal line disposed in the frame region and connected to one of a source electrode or a drain electrode of each of the thin-film transistors; and conductive lines each connected to the other of the source electrode or the drain electrode of each of the thin-film transistors and extending from the frame region into the display region. The control line includes a first control line portion in the first line layer, a second control line portion in the second line layer, and a third control line portion in the third line layer. Hereinafter, the TFTs in the frame region are also referred to as peripheral TFTs.

In the image display device, the control line includes the first control line portion in the first line layer, the second control line portion in the second line layer, and the third control line portion in the third line layer. This control line having a laminated structure of at least three layers can have a smaller width than a control line formed from one or two line layers. Thus, the image display device can have a reduced frame region.

In the image display device, typically, the conductive lines are each connected to at least one peripheral TFT and are connected to different peripheral TFTs. The peripheral TFTs include the respective semiconductor layers, and the semiconductor layers are independently disposed in an island pattern.

Here, the "semiconductor layer" encompasses layers having the characteristics of a semiconductor (e.g., channel regions) and layers (e.g., source regions and drain regions) having been subjected to a resistance reduction treatment (hereinafter, also referred to as conduction imparting treatment) causing a layer having the characteristics of a semiconductor to have a lower resistivity than the channel regions.

The "gate electrode" is one of the three electrodes constituting a TFT (the other electrodes are a source electrode and a drain electrode), and modulates the charge amount to be induced in the corresponding channel region of the semiconductor layer according to the voltage applied to the gate electrode, thereby controlling the current flowing between the source and drain electrodes. The "source electrode" is one of the three electrodes constituting the TFT, and is a source of the carrier flowing in the semiconductor layer of the TFT. The "drain electrode" is one of the three electrodes constituting the TFT, and is a receiver of the carrier flowing in the semiconductor layer of the TFT.

Each of the line layers and the insulating films may be a single layer formed from a single material, or may be a stack of layers of which two adjacent layers are formed from different materials.

Each line layer may be formed from any material, and is preferably formed from a metal. Each line layer is preferably a metal layer.

The first control line portion and the second control line portion are preferably connected to each other via the third control line portion.

In the substrate, the first control line portion is disposed in the first line layer, which is the first conductive layer, and the second control line portion is disposed in the second line layer, which is the second conductive layer. The first control line portion and the second control line portion are connected to each other via the third control line portion in the third line layer that is disposed on the third insulating film. Thus, contact holes can be formed in the first insulating film using the photomask used to pattern the third insulating film. In other words, connecting the first control line portion and the second control line portion to each other via the third control line portion can eliminate a specialized photomask to form contact holes in the first insulating film, so that the number of photomasks used in the production process can be reduced and the resistance of the control line can be reduced without any additional step.

Preferably, the control line is located to intersect extended lines of the conductive lines, and the first control line portion and the second control line portion are connected to each other via the third control line portion at two or more positions in a region between two extended lines of two adjacent conductive lines.

This structure can more reduce the resistance of the control line.

Here, the "extended lines of the conductive lines" are virtual lines each of which is an extension of the longitudinal center line of each conductive line in the direction away from the display region toward the edge of the substrate while maintaining the extending direction of the end portion of the center line.

Preferably, the peripheral TFTs each further include a channel light-shielding film in the first line layer, and the gate electrode is in the second line layer.

This structure can form the channel light-shielding film using the first line layer including the first control line portion and can reduce application of light to the semiconductor layer. This can reduce degradation of the switching characteristics of each peripheral TFT in the semiconductor layer caused by application of light to the semiconductor layer. The channel light-shielding film may be connected to the gate electrode, and the channel light-shielding film and the gate electrode may be used as a lower layer gate electrode and an upper layer gate electrode, respectively. In this structure, the upper layer gate electrode can be disposed above the semiconductor layer and the lower layer gate electrode can be disposed below the semiconductor layer to form a double gate structure TFT as each peripheral TFT, whereby the TFTs can exhibit stable performance in the on and off states.

Here, the "channel light-shielding film" is a light shielding member disposed on the insulating substrate side of the semiconductor layer, and reduces application of light to the semiconductor layer from the insulating substrate side and functions to prevent degradation of the switching characteristics of the TFT. The channel light-shielding film is preferably disposed to overlap at least the entire channel region of the semiconductor layer.

The substrate may further include TFTs in the display region and gate lines each connected to a gate electrode of each TFT in the display region. The conductive lines may intersect the gate lines in the display region. Hereinafter, the TFTs in the display region are also referred to as pixel TFTs.

This structure enables use of the conductive lines as conductive lines other than the gate lines.

Here, the "gate lines" are conductive lines connected to gate electrodes (typically, bus lines connected to gate electrodes) of pixel TFTs and supply a scanning signal (signal that controls the on and off states of TFTs) to the gate electrodes of the pixel TFTs connected.

Preferably, the conductive lines are data lines each connected to one of a source electrode or a drain electrode of each pixel TFT, the substrate further includes pixel electrodes, and the pixel electrodes are each connected to the other of the source electrode or the drain electrode of the pixel TFTs.

In this structure, the data lines can be inspected for connection failures such as open circuits by turning the peripheral TFTs on while appropriately inputting a signal to the common signal line. In this case, typically, the conductive lines are each connected to at least one pixel TFT and are connected to different pixel TFTs. Typically, electrodes connected with the conductive lines (data lines) are common to all the pixel TFTs, and electrodes connected with the pixel electrodes are common to all the pixel TFTs. In other words, typically, in the case where each conductive line (data line) is connected to the source electrode of each pixel TFT, each pixel electrode is connected to the drain electrode of the corresponding pixel TFT, and in the case where each conductive line (data line) is connected to the drain electrode of each pixel TFT, each pixel electrode is connected to the source electrode of the corresponding pixel TFT.

As for the display panel including the substrate, a method for inspecting the data lines for open circuits is described in detail. The pixel TFTs in the display panel are turned on, and while an inspection signal is input to the common signal line, a signal that turns the peripheral TFTs on for at least a given period of time is input to the control line. When the data lines include an open-circuited data line, above the open-circuited data line, the inspection signal is supplied to the pixels closer to the peripheral TFTs than the open-circuited portion, which provides normal display, whereas the inspection signal is not supplied to the pixels farther from the peripheral TFTs than the open-circuited portion, which provides abnormal display.

The method for inspecting the data lines for open circuits is specifically described by taking a liquid crystal display device as an example. First, a liquid crystal panel is prepared which includes the TFT substrate, a counter substrate facing the TFT substrate, and a liquid crystal layer between the TFT substrate and the counter substrate. A light source (backlight) and a polarizing plate are disposed on the back side of the liquid crystal panel. Another polarizing plate is disposed on the viewing side (inspector side/viewer side). Then, in this state, the gate drive circuit is driven to supply a scanning signal to the gate lines to turn on the pixel TFTs in the display region. In addition, while an inspection signal (e.g., 0 to 7 V, a signal providing white display when the liquid crystal panel is in the normally black mode) is input to the common signal line, a signal that turns the peripheral TFTs on for at least a given period of time is input to the control line. When the data lines include an open-circuited data line, the inspection signal is supplied through the open-circuited data line to the pixels closer to the peripheral TFTs than the open-circuited portion, which provides normal display (e.g., white display is provided in the above case), whereas the inspection signal is not supplied to the pixels farther from the peripheral TFTs than the open-circuited portion, which provides abnormal display (e.g., a dark line appears in the above case). Thus, in the present embodiment, an inspector (viewer) can visually observe the abnormal display to detect the open circuits of the data lines.

Even in the case of an image display device in which the data lines in the TFT substrate are not data lines connected to the peripheral TFTs as in the present embodiment, but typical data lines connected to only the pixel TFTs (hereinafter, also referred to as image display device including only typical data lines), an inspector can visually inspect for open circuits by inputting an inspection signal from a source driver to the data lines. However, in the case where the image display device including only typical data lines is inspected after the source driver is mounted thereon and the detected open-circuited data lines are not repaired (for the reason that, for example, the cost of repair is too high for the cost of the image display device itself or there are too many open-circuited data lines to repair), the cost of the source driver and the cost for mounting the source driver are wasted. Also in the case where open-circuits could not be repaired (for the reason that, for example, the open-circuits were repaired by melt connection, which increased connection resistance), the cost of the source driver and the cost for mounting the source driver are wasted. On the other hand, in the present embodiment, a terminal for inputting an inspection signal to the common signal line may be provided to inspect the data lines, which eliminates a specific source driver.

In the case where the image display device including only typical data lines is not provided with a source driver and an inspection signal to be input to the common signal line is input to terminals of the data lines for data signal, highly precise alignment is needed because many small terminals of the data lines are present (e.g., several hundred to several thousand terminals each having a size of 15×150 µm are arranged). Further, when an inspection signal is input using, for example, a probe, the probe may scratch the terminals, which may result in connection failure with a driver. On the other hand, in the present embodiment, one or several terminals each having a size of 300 µm×300 µm may be disposed to input a signal to the common signal line.

Here, the "data line" is a conductive line that supplies a data signal (e.g., video signal) to the pixel TFTs connected and is typically a bus line connected to source electrodes.

Typically, one of the gate line or the data line is disposed linearly to vertically cross the array region in which the pixel TFTs are arranged in a matrix, and the other is disposed linearly to horizontally cross the array region.

The substrate further includes touch panel electrodes (hereinafter, also referred to as TP electrodes) in the display region, and the conductive lines are touch panel lines (hereinafter, also referred to as TP lines) each connected to any of the TP electrodes. The conductive lines are each connected to one TP electrode and are connected to different TP electrodes.

Preferably, during the writing period for writing a display signal to pixels in the display region, the peripheral TFTs in the frame region are turned on, and a signal is supplied to each conductive line from each end of the conductive line, and during the sensing period for detecting at least one of contact or proximity of a pointer with the display region, the peripheral TFTs are turned off, and a signal is supplied to each conductive line from an end of the conductive line, the end being not connected to any of the peripheral TFTs.

This structure can supply a signal during the writing period not only from an end of the conductive line (typically from the driver side) but also from the other end of the conductive line (from the peripheral TFT side). This can reduce the difference in the time that the signal takes to reach the TP electrodes, caused by the difference in the position of the TP electrodes. As a result, the signal attenuation caused by the difference in the position of the TP electrodes can be reduced.

Here, the phrase "TFTs are turned off" means, for example, in an n-channel transistor, a state where a voltage at which the potential difference between the gate electrode and a source electrode is less than the threshold is applied to the gate electrode, and the source electrode and a drain electrode are not substantially electrically connected to each other. The phrase "TFTs are turned on" means, for example, in an n-channel transistor, a state where a voltage at which the potential difference between a gate electrode and a source electrode is not less than the threshold is applied to the gate electrode, and the source electrode and a drain electrode are substantially electrically connected to each other.

The signal supplied to each conductive line from each end of the conductive line during the writing period may be a common signal which is a signal applied commonly to the TP electrodes, for example. The signal supplied to each conductive line from an end of the conductive line during the sensing period may be a touch signal which is a pulse signal applied to detect the change of the capacitance of the TP electrodes, for example.

The writing period and the sensing period are alternately provided. For example, when the number of frames per second is 60 frames (60 Hz), one writing period and one sensing period are provided per frame.

The common signal line preferably includes a first common signal line portion in the first line layer, a second common signal line portion in the second line layer, and a third common signal line portion in the third line layer.

This common signal line having a laminated structure of at least three layers can have a smaller width than a common signal line formed from one or two line layers. Thereby, a more reduced frame region can be achieved.

The first common signal line portion and the second common signal line portion are preferably connected to each other via the third common signal line portion.

In the substrate, the first common signal line portion is disposed in the first line layer, which is the first conductive layer, and the second common signal line portion is disposed in the second line layer, which is the second conductive layer. The first common signal line portion and the second common signal line portion are connected to each other via the third common signal line portion in the third line layer that is disposed on the third insulating film. Thus, contact holes can be formed in the first insulating film using the photomask used to pattern the third insulating film. In other words, connecting the first common signal line portion and the second common signal line portion to each other via the third common signal line portion can eliminate a specialized photomask to form contact holes in the first insulating film, so that the number of photomasks used in the production process can be reduced and the resistance of the common signal line can be reduced without any additional step.

Preferably, the substrate includes a plurality of the common signal lines, the common signal lines are parallel to each other in a region farther from the display region than the peripheral TFTs, the peripheral TFTs are each connected to any of the common signal lines, the common signal lines include a common signal line closest to the display region and at least one common signal line having branch lines, each of the branch lines intersecting one or more common signal lines closer to the display region than the common signal line from which the branch lines extend, and the branch lines are each connected to any of the peripheral TFTs.

This structure can connect each of the conductive lines to any of the common signal lines. Thus, when the common signal lines receive different signals, the different signals can be input to the corresponding group of the conductive lines connected to the same common signal line.

The substrate includes a plurality of the common signal lines and the peripheral TFTs which are connected to any of the common signal lines with a repetition of a specific connection order when all the peripheral TFTs are viewed from one endmost peripheral TFT toward the other endmost peripheral TFT. The peripheral TFTs constituting this specific connection order are preferably connected to different common signal lines.

The effects achieved by this structure are described below by taking the case where the number of the common signal lines is two and the case where the number of the common signal lines is three or more as examples.

Each common signal line is connected to one of the source electrode or the drain electrode of one peripheral TFT, and each conductive line is connected to the other of the source electrode or the drain electrode. When the number of the common signal lines is one, all the conductive lines are connected to the single common signal line via the peripheral TFTs. In this case, the open circuit of each conductive line is detectable, but the short-circuit of adjacent conductive lines is undetectable. On the other hand, when the substrate includes two common signal lines (first common signal line and second common signal line), the peripheral TFTs are connected to any of the common signal lines with a repetition of a specific connection order when all the peripheral TFTs are viewed from one endmost peripheral TFT toward the other endmost peripheral TFT, and the peripheral TFTs constituting this specific connection order are connected to different common signal lines, in other words, when the peripheral TFTs are connected alternately to the first common signal line and the second common signal line, adjacent conductive lines can receive different signals (e.g., a white display signal is supplied to one of the adjacent conductive lines, and a black display signal is supplied to the other). If the two adjacent conductive lines are short-circuited, the pixels corresponding to the two conductive lines provide abnormal display, and thereby the short-circuit is detected.

When the substrate includes three common signal lines (first common signal line, second common signal line, and third common signal line), the peripheral TFTs are connected to the common signal lines with a repetition of a specific connection order when all the peripheral TFTs are viewed from one endmost peripheral TFT toward the other endmost peripheral TFT, and the peripheral TFTs constituting this specific connection order are connected to different common signal lines. In this structure, when the conductive lines are data lines, and the three common signal lines are connected to data lines corresponding to red pixels (subpixels), data lines corresponding to blue pixels (subpixels), and data lines corresponding to green pixels (subpixels), inspection signals can be sequentially input to each common signal line to perform monochrome display for inspection, and thereby a pixel defect is easily detected, for example. The specific connection order may be, for example, the order of the first, second, and third common signal lines, the order of the first, third, and second common signal lines, the order of the second, third, and first common signal lines, or the order of the third, second, and first common signal lines. Here, the case where subpixels of three colors are arranged is described. Similarly to this case, also in the case where subpixels of four or more colors are arranged, the same number of common signal lines as the number of the colors for subpixels are disposed, and thereby, inspection can be performed through monochrome display.

Preferably, the branch lines are in the third line layer, the third common signal line portion in each of the one or more common signal lines intersecting the branch lines is disposed in a region between two adjacent branch lines, the first common signal line portion and the second common signal line portion in each of the one or more common signal lines intersecting the branch lines are connected to each other via the third common signal line portion at each end portion of the third common signal line portion.

This structure can reduce the resistance of the common signal lines.

Hereinafter, the image display devices of other embodiments of the present invention are specifically described with reference to the drawings by taking a liquid crystal display device as an example. In the following description, members having the same or similar functions in different drawings are commonly provided with the same reference sign and the description there of is not repeated.

Embodiment 1

Figure 2:
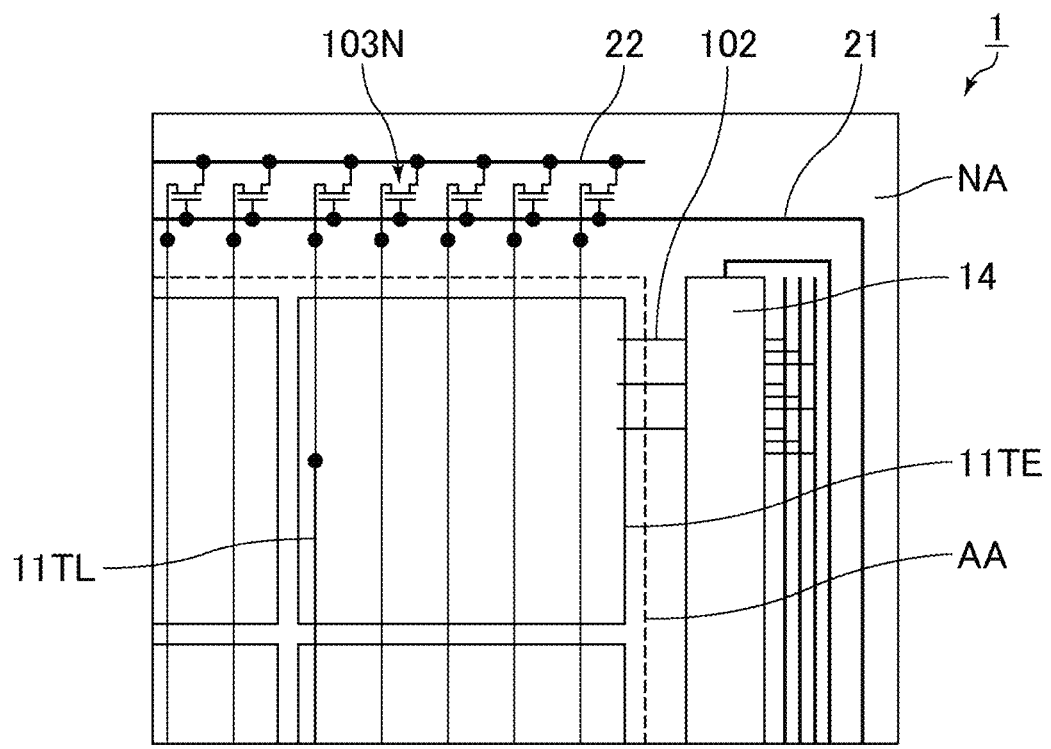
FIG. 2 is an enlarged schematic plan view of the region surrounded by the dashed line in FIG. 1.

FIG. 1 is a schematic plan view of a liquid crystal display device of Embodiment 1. FIG. 2 is an enlarged schematic plan view of the region surrounded by the dashed line in FIG. 1. As shown in FIG. 1 and FIG. 2, a liquid crystal display device 1 of the present embodiment includes a display region AA for displaying an image and a frame region NA which is a peripheral region of the display region AA. The liquid crystal display device 1 also includes a thin-film transistor substrate (hereinafter, also referred to as TFT substrate) 1A, a counter substrate 1B facing the TFT substrate 1A, and a liquid crystal layer (not shown) between the TFT substrate 1A and the counter substrate 1B. The TFT substrate 1A in the present embodiment is also referred to as an array substrate.

The liquid crystal display device 1 includes a first alignment film (not shown) between the TFT substrate 1A and the liquid crystal layer; a second alignment film (not shown) between the counter substrate 1B and the liquid crystal layer; a first polarizing plate (not shown) on the surface remote from the liquid crystal layer of the TFT substrate 1A; a second polarizing plate (not shown) on the surface remote from the liquid crystal layer of the counter substrate 1B; and a backlight (not shown) on the surface remote from the liquid crystal layer of the first polarizing plate. The first polarizing plate and the second polarizing plate are in crossed Nicols in which their polarization axes are perpendicular to each other.

The TFT substrate 1A includes data lines (not shown in FIG. 1 and FIG. 2) extending from the frame region NA into the display region AA and gate lines 102 extending from the frame region NA into the display region AA and intersecting the data lines. In the display region AA, thin-film transistors (hereinafter, also referred to as pixel TFTs, not shown) as switching elements are disposed at the respective intersections of the data lines and the gate lines 102. Each region surrounded by two adjacent data lines and two adjacent gate lines 102 is provided with a pixel electrode (not shown in FIG. 1 and FIG. 2). Each pixel electrode is connected to the corresponding data line via the semiconductor layer of the corresponding pixel TFT.

Rectangular touch panel electrodes (hereinafter, also referred to as TP electrodes) 11TE with slits (openings) are disposed above the pixel electrodes in the display region AA with a second protective film (not shown in FIG. 1 and FIG. 2) serving as a fourth insulating film in between. Each TP electrode 11TE is disposed to cover the corresponding pixel electrode. From each TP electrode 11TE extends a touch panel line (hereinafter, also referred to as TP line) 11TL serving as the conductive lines toward the upper area of the frame region NA and the lower area of the frame region NA.

In FIG. 1, the lower area of the frame region NA of the TFT substrate 1A is provided with a driver 12 for both data signals and touch sensors and a flexible printed circuit board (hereinafter, also referred to as FPC) 13, and the TP lines 11TL are connected to the driver 12 for both data signals and touch sensors.

Each of the left and right areas of the frame region NA of the TFT substrate 1A is provided with a gate drive circuit 14 monolithically formed on the TFT substrate 1A, and the gate lines 102 are connected to the left or right gate drive circuit 14.

The upper area of the frame region NA of the TFT substrate 1A is provided with a control line 21 which passes through the right area of the frame region NA and is connected to a terminal in the right area of the FPC 13, a common signal line 22 which passes through the left area of the frame region NA and is connected to a terminal in the left area of the FPC 13, and peripheral TFTs 103N.

The control line 21 is connected to the gate electrode of each peripheral TFT 103N. The common signal line 22 is connected to one of the source electrode or the drain electrode of each peripheral TFT 103N, and each TP line 11TL is connected to the other of the source electrode or the drain electrode of the corresponding peripheral TFT 103N. Typically, electrodes connected to the common signal line 22 are common to all the peripheral TFTs 103N, and electrodes connected to the TP lines 11TL are common to all the peripheral TFTs 103N. In other words, typically, in the case where the common signal line 22 is connected to the source electrode of each peripheral TFT 103N, each TP line 11TL is connected to the drain electrode of the corresponding peripheral TFT 103N, and in the case where the common signal line 22 is connected to the drain electrode of each peripheral TFT 103N, each TP line 11TL is connected to the source electrode of the corresponding peripheral TFT 103N.

Each TP line 11TL extends from the upper area of the frame region NA to the driver 12 for both data signals and touch sensors disposed in the lower area of the frame region NA through the corresponding TP electrode 11TE in the display region AA, and the TP line 11TL is connected to the driver 12.

In this structure, during a writing period for writing a display signal to pixels in the display region AA, the peripheral TFTs 103N are turned on, and a common signal is supplied to each TP line 11TL from each end of the TP line 11TL, and during a sensing period for detecting at least one of contact or proximity of a pointer with the display region AA, the peripheral TFTs 103N are turned off, and a signal is supplied to each TP line 11TL from an end of the TP line 11TL, the end being not connected to any of the peripheral TFTs 103N.

As described above, a signal to be applied to the TP electrodes 11TE is supplied to each TP line 11TL from each side of the display region AA (from the side of the driver 12 for both data signals and touch sensors and the opposite side). Thus, even if the potentials of the TP electrodes 11TE fluctuate during the transition period from the sensing period to the writing period or during the writing period due to the parasitic capacitance formed between the electrodes and the data lines, for example, the potentials can easily return to the predetermined potential. This can reduce the variation of the potential difference among the segments, and can reduce display defects.

Specifically, in the writing period, the peripheral TFTs 103N are turned on based on the control by the driver 12 for both data signals and touch sensors, a common signal is supplied to each TP line 11TL from each end of the TP line 11TL, and a common voltage corresponding to the common signal is applied to each TP electrode 11TE. The liquid crystal display device 1 further includes a controller (not shown), and in the writing period, the gate drive circuit 14 sequentially supplies scanning signals to the gate lines 102 based on the control by the controller. The driver 12 for both data signals and touch sensors supplies a data signal to the data lines based on the control by the controller when the pixel TFTs are in the voltage applied state according to the scanning signal. Each pixel electrode is set at a potential according to the data signal supplied thereto through the corresponding pixel TFT, so that a fringe electric field is generated between the pixel electrode and the TP electrode 11TE and thereby liquid crystal molecules in the liquid crystal layer are rotated. In this manner, the magnitude of voltage applied between each pixel electrode and the TP electrode 11TE is controlled to change the retardation in the liquid crystal layer, whereby transmission and blocking of light is controlled. The liquid crystal display device 1 of the present embodiment is a fringe field switching (FFS) mode liquid crystal display device. In the present embodiment, a dot pitch equivalent to 62 μm×186 μm is assumed to be in the FFS mode, but the pixel size, the shape of the slits, and the number of the slits, for example, for each TP electrode 11TE may be modified as appropriate. Each TP electrode 11TE is a quadrilateral electrode having sides of about 2 mm to 6 mm long, for example, and is connected to at least one TP line 11TL. When the peripheral TFTs 103N are turned on, the same common voltage is applied to the TP electrodes 11TE. Thus, the TP electrodes 11TE function as a common electrode (counter electrode) facing the pixel electrodes when the peripheral TFTs 103N are turned on.

In the sensing period, the peripheral TFTs 103N are turned off based on the control by the driver 12 for both data signals and touch sensors. A certain amount of capacitance (parasitic capacitance) is formed between each TP electrode 11TE and a conductive member overlapping the TP electrode 11TE, such as a gate line. When a pointer such as a finger approaches each TP electrode 11TE, a new capacitance is formed between the pointer and the TP electrode 11TE. To detect a change of the capacitance using the driver 12 for both data signals and touch sensors, the touch signal is applied from the driver 12 for both data signals and touch sensors to the TP electrode 11TE through the corresponding TP line 11TL. Thereby, the presence of contact and/or proximity of the pointer can be detected. The touch sensor in the present embodiment is a self-capacitance touch sensor.

The TP electrodes 11TE are segments of a common electrode for applying a common voltage to the pixels, and can function as a common electrode during the writing period and can function as TP electrodes during the sensing period, as described above.

During the writing period, the TP electrodes 11TE preferably have a constant potential.

Figure 3:
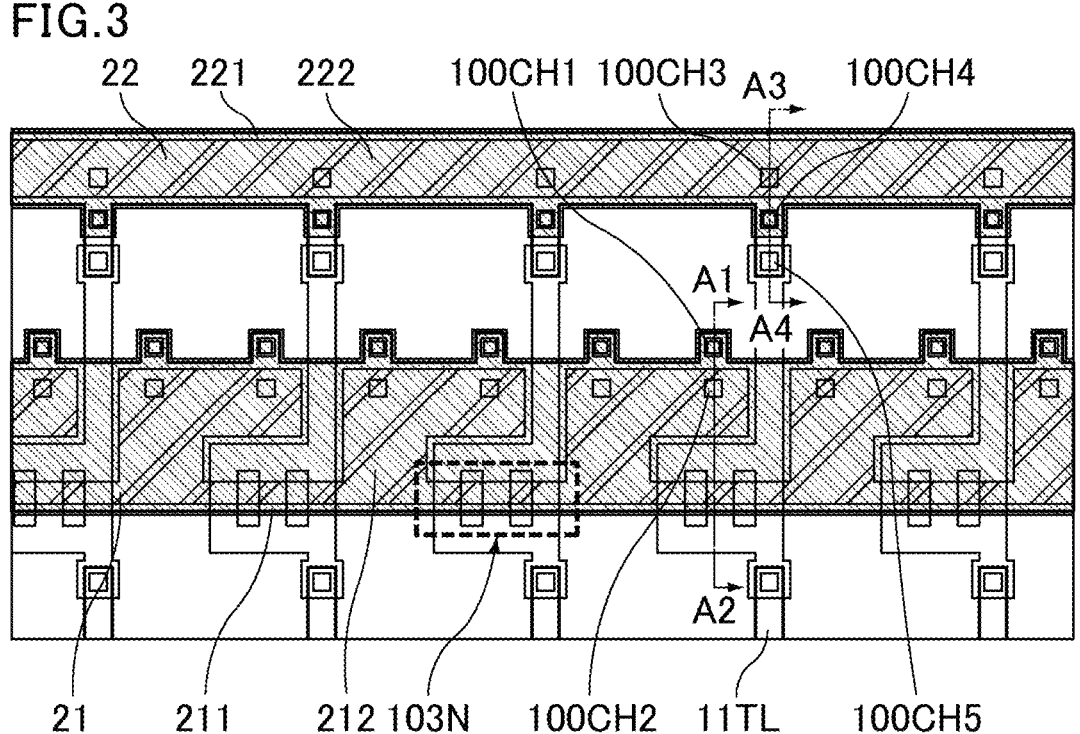
FIG. 3 is another schematic plan view of the liquid crystal display device of Embodiment 1, with a first line layer and a second line layer highlighted.
Figure 4:
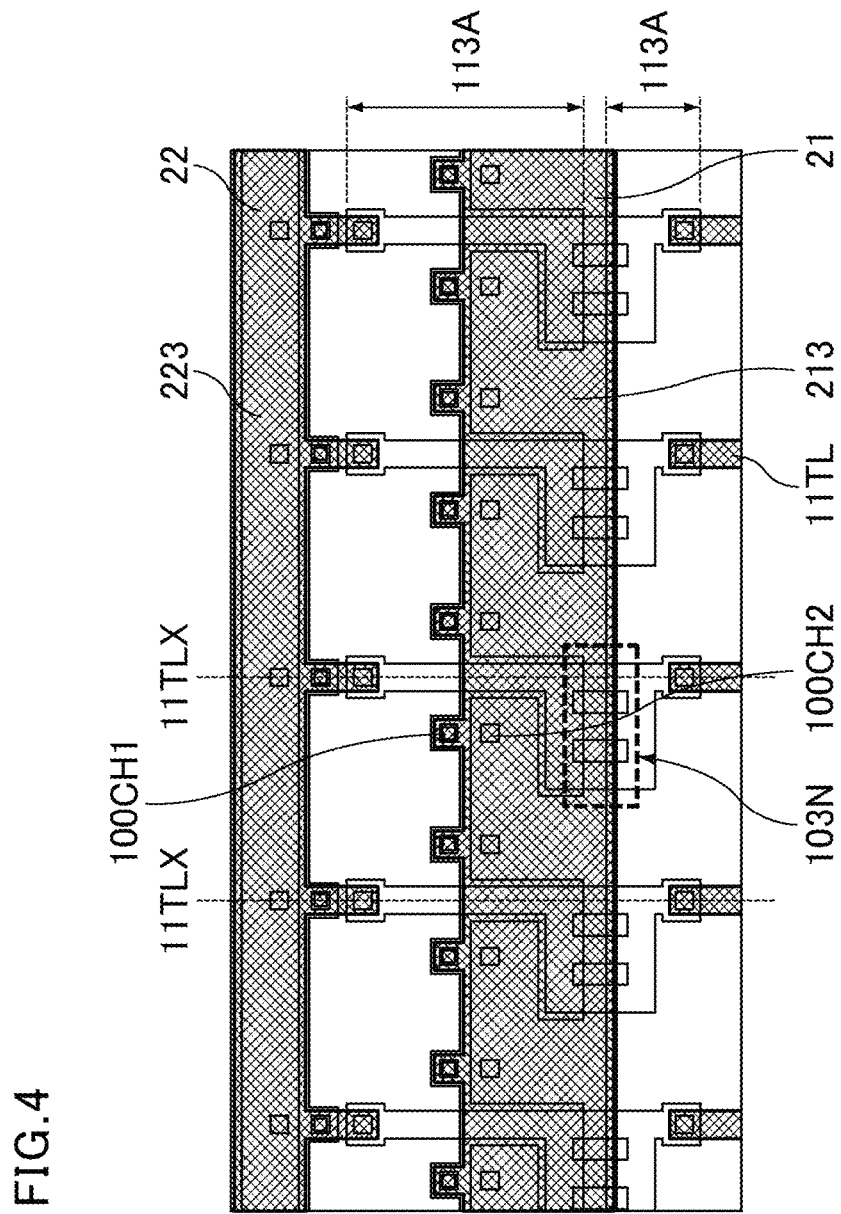
FIG. 4 is yet another schematic plan view of the liquid crystal display device of Embodiment 1, with a third line layer highlighted.
Figure 5B:
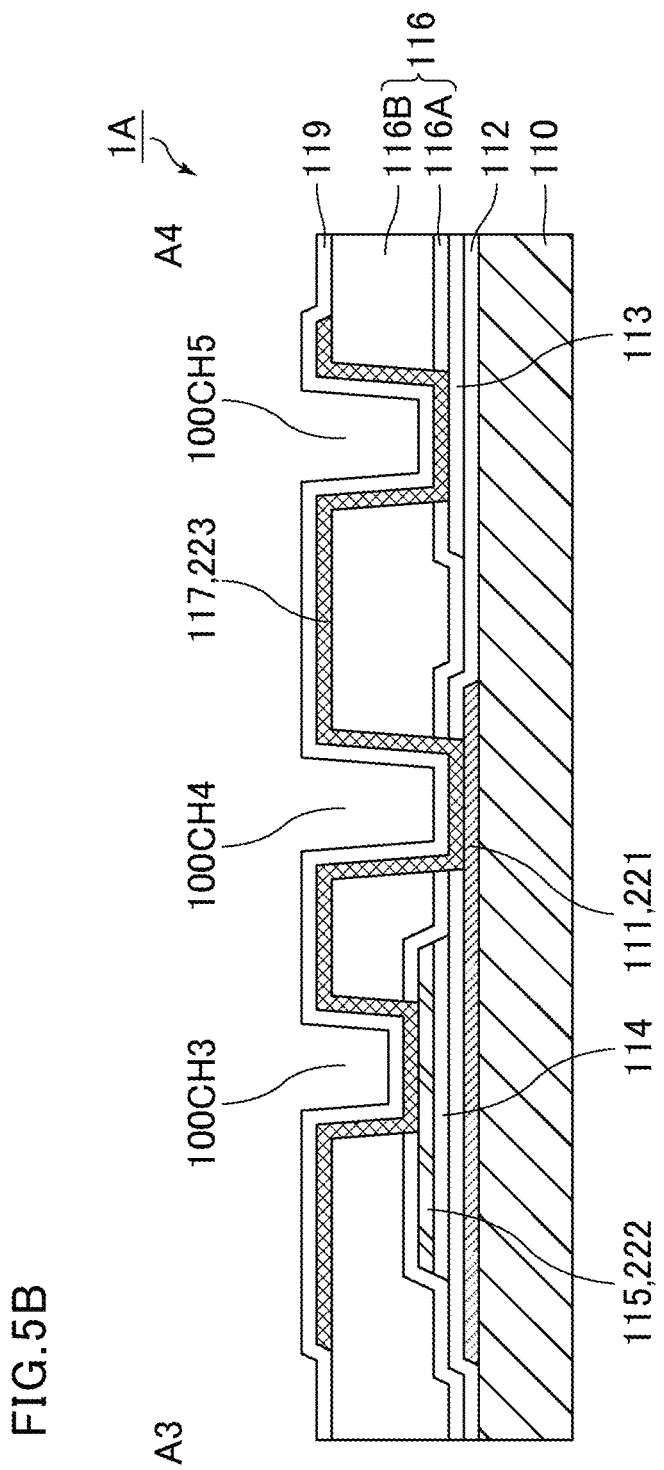
FIG. 5B is another schematic cross-sectional view of the TFT substrate in the liquid crystal display device of Embodiment 1.

FIG. 3 is a schematic plan view of the liquid crystal display device of Embodiment 1, with a first line layer and a second line layer highlighted. FIG. 4 is a schematic plan view of the liquid crystal display device of Embodiment 1, with a third line layer highlighted. FIG. 5A and FIG. 5B are schematic cross-sectional views of a TFT substrate in the liquid crystal display device of Embodiment 1. FIG. 5A and FIG. 5B show cross sections taken along the line A1-A2 and the line A3-A4 in FIG. 3, respectively.

As shown in FIG. 3, FIG. 4, FIG. 5A, and FIG. 5B, the TFT substrate 1A includes an insulating substrate 110 and on the insulating substrate 110, a stack sequentially including a first line layer 111, a lower layer insulating film 112 as a first insulating film, a semiconductor layer 113, a gate insulating film 114 as a second insulating film, a second line layer 115, a first protective film 116 as a third insulating film, a third line layer 117, pixel electrodes (not shown in FIG. 3, FIG. 4, FIG. 5A, and FIG. 5B) as first transparent conductive films, a second protective film 119 as a fourth insulating film, and TP electrodes 11TE (not shown in FIG. 3, FIG. 4, FIG. 5A, and FIG. 5B) as second transparent conductive films. The control line 21 includes a first control line portion 211 in the first line layer 111, a second control line portion 212 in the second line layer 115, and a third control line portion 213 in the third line layer 117. This control line 21 having a laminated structure of at least three layers can have a small width while having a low resistance. Thereby, the liquid crystal display device 1 can have a reduced frame region.

As shown in FIG. 3 and FIG. 4, the first control line portion 211, the second control line portion 212, and the third control line portion 213 are disposed linearly (preferably in the form of a straight line) so as to connect the regions where the peripheral TFTs 103N are formed. These portions 211 to 213 preferably overlap each other. This structure can achieve a more reduced frame region.

As shown in FIG. 3 and FIG. 4, the TP lines 11TL are disposed in the third line layer 117 and are each connected to the source electrode or the drain electrode of each peripheral TFT 103N via the corresponding contact hole formed in the first protective film 116.

As shown in FIG. 5A, each peripheral TFT 103N includes a channel light-shielding film 103Z in the first line layer 111, a semiconductor layer 113, and an upper layer gate electrode 103G2 in the second line layer 115. The first control line portion 211 and the second control line portion 212 are connected to each other via the third control line portion 213. In other words, the TFT substrate 1A in the liquid crystal display device 1 of the present embodiment includes the TP lines 11TL formed above the insulating substrate 110, the peripheral TFTs 103N formed in the peripheral region of the display region AA to supply a common signal to the TP lines 11TL, the common signal line 22, and the control line 21 that controls the peripheral TFTs 103N. Each peripheral TFT 103N is a top gate TFT including the corresponding upper layer gate electrode 103G2, and also includes a layer that functions as at least the channel light-shielding film 103Z on the bottom gate side. The control line 21 is formed from a laminate of the first control line portion 211 in the same layer as the corresponding channel light-shielding film 103Z, the second control line portion 212 in the same layer as the corresponding upper layer gate electrode 103G2, and the third control line portion 213 in an upper layer relative to the first control line portion 211 and the second control line portion 212 (in the present embodiment, formed in the same layer as the TP lines 11TL). The first control line portion 211 and the second control line portion 212 are connected to each other via the third control line portion 213. As described above, in the liquid crystal display device 1 of the present embodiment, the peripheral TFT 103N is a top gate TFT that includes the upper layer gate electrode 103G2 and also includes a layer that functions as at least the channel light-shielding film 103Z on the bottom gate side. Each peripheral TFT 103N substantially has a structure in which a gate electrode is laminated on each side of the corresponding semiconductor layer 113 (double gate structure). In other words, part of the second control line portion 212 functions as the upper layer gate electrode 103G2.

JP 2015-210811 A does not specifically disclose the structure of the control line (power supply control line) that controls the peripheral TFTs, and, in particular, does not disclose the features of the present embodiment, i.e., the peripheral TFTs having a top gate (substantially double gate) structure and the control line having three conductive line layers.

In the present embodiment, part of the semiconductor layer 113 is subjected to plasma treatment using the upper layer gate electrode 103G2 and the gate insulating film 114 as masks so as to have a low resistance (conductivity). The presence of the portion having a low resistance (conductivity imparted portion 113A) provides a connection between each peripheral TFT 103N and the corresponding common signal line 22 and a connection between each peripheral TFT 103N and the corresponding TP line 11TL. Thus, as shown in FIG. 5A, the second control line portion 212 including the upper layer gate electrode 103G2 is disposed so as not to overlap the semiconductor layer 113 in the regions other than the channel region of the semiconductor layer 113.

In FIG. 3, FIG. 4, and FIG. 5A, the channel region 103C of each peripheral TFT 103N is divided into three portions, but may be divided into more portions or not.

The structure having three conductive line layers in the present embodiment is applicable to not only the control line 21 but also the common signal line 22. The common signal line 22 includes a first common signal line portion 221 in the first line layer 111, a second common signal line portion 222 in the second line layer 115, and a third common signal line portion 223 in the third line layer 117. This structure can also reduce the width of the common signal line 22, and can achieve a more reduced frame region.

As shown in FIG. 3 and FIG. 5A, the first control line portion 211 and the third control line portion 213 are connected to each other via a contact hole 100CH1 formed in the lower layer insulating film 112 and the first protective film 116. The second control line portion 212 and the third control line portion 213 are connected to each other via a contact hole 100CH2 formed in the first protective film 116. Here, not the two contact holes 100CH1 and 100CH2 as shown in FIG. 3 and FIG. 5A are formed, but one contact hole may be formed to overlap both the first control line portion 211 and the second control line portion 212.

As shown in FIG. 3 and FIG. 5B, the second common signal line portion 222 and the third common signal line portion 223 are connected to each other via a contact hole 100CH3 formed in the first protective film 116. The first common signal line portion 221 and the third common signal line portion 223 are connected to each other via a contact hole 100CH4 formed in the lower layer insulating film 112 and the first protective film 116. The third common signal line portion 223 is connected to the source region of the semiconductor layer 113 via a contact hole 100CH5 in the first protective film 116. Here, not the three contact holes 100CH3, 100CH4, and 100CH5 as shown in FIG. 3 and FIG. 5B are formed, but one contact hole may be formed to overlap all the first common signal line portion 221, the second common signal line portion 222, and the source region of the semiconductor layer 113.

As shown in FIG. 4, the control line 21 is located to intersect extended lines 11TLX of the TP lines 11TL, the first control line portion 211 and the second control line portion 212 are connected to each other via the third control line portion 213 at two or more positions in a region between two extended lines 11TLX of two adjacent TP lines 11TL. This structure can more reduce the resistance of the control line 21.

Figure 6:
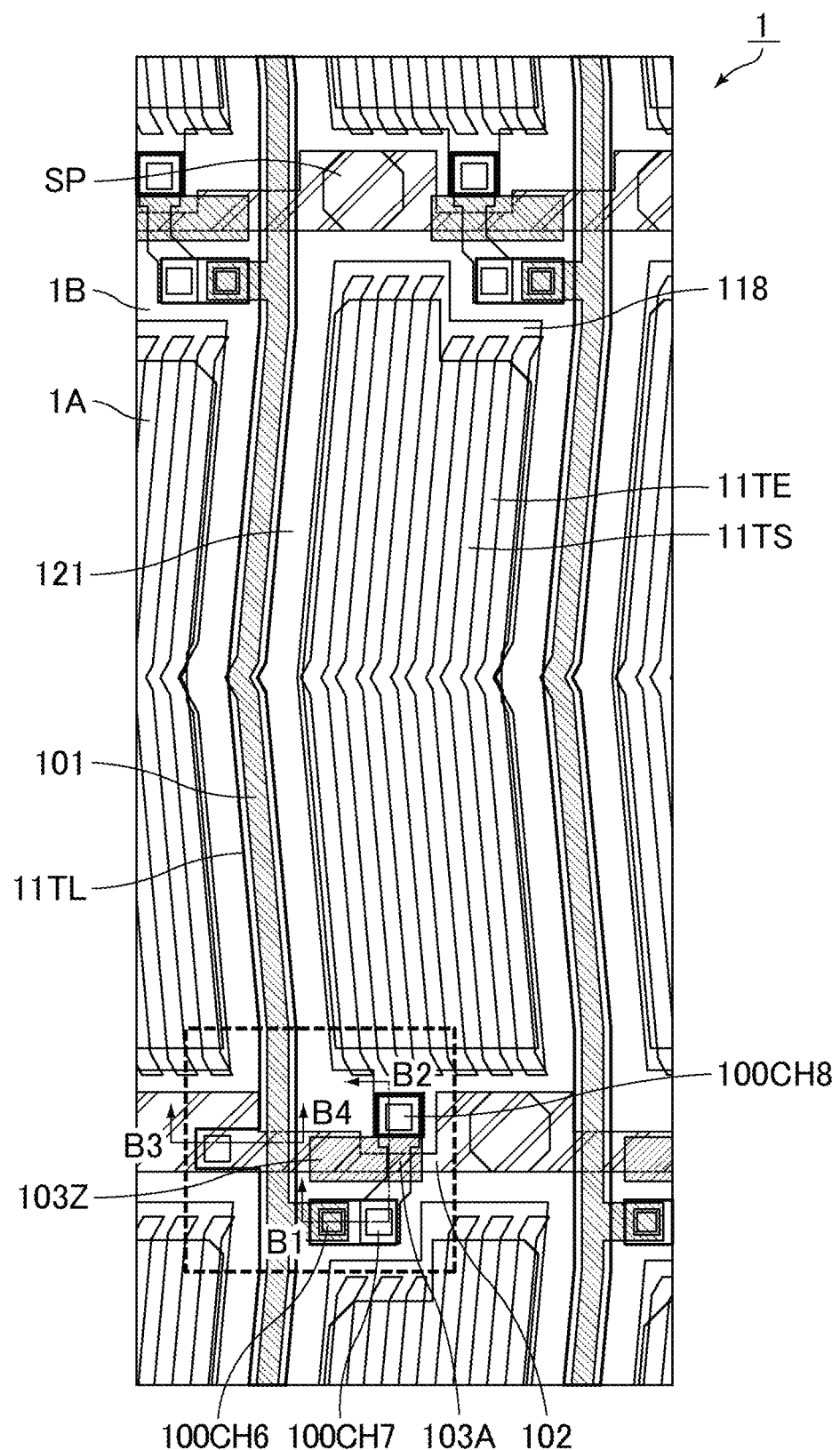
FIG. 6 is yet another schematic plan view of the liquid crystal display device of Embodiment 1.
Figure 7B:
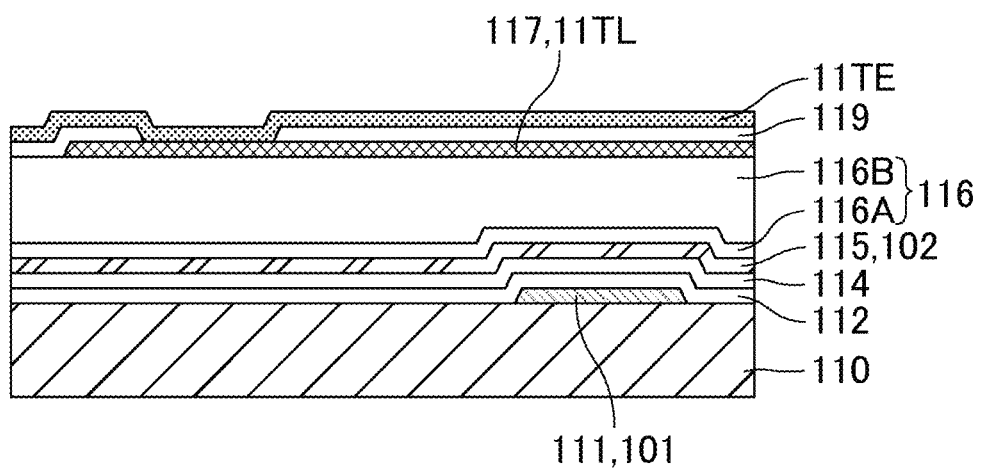
FIG. 7B is yet another schematic cross-sectional view of the TFT substrate in the liquid crystal display device of Embodiment 1.

FIG. 6 is a schematic plan view of the liquid crystal display device of Embodiment 1. FIG. 7A and FIG. 7B are schematic cross-sectional views of a TFT substrate in the liquid crystal display device of Embodiment 1. FIG. 7A and FIG. 7B show cross sections taken along the line B1-B2 and the line B3-B4 in FIG. 6, respectively. As shown in FIG. 6, FIG. 7A, and FIG. 7B, each region surrounded by two adjacent data lines 101 and two adjacent gate lines 102 is provided with a pixel electrode 118. Each pixel electrode 118 is connected to the corresponding data line 101 via the semiconductor layer 113 of the corresponding pixel TFT 103A. Each TP electrode 11TE provided with slits (openings) 11TS is formed above the pixel electrode 118. Although the present embodiment exemplifies a case where each pixel TFT 103A is a top gate TFT including the channel light-shielding film 103Z that is disposed on the bottom gate side and is not connected to the gate line 102, the pixel TFT 103A may be a double gate TFT like the peripheral TFTs 103N.

As shown in FIG. 6, FIG. 7A, and FIG. 7B, each data line 101 in the first line layer 111 and a switching electrode 117A1 in the third line layer 117 are connected to each other via a contact hole 100CH6 formed in the lower layer insulating film 112 and the first protective film 116. The switching electrode 117A1 is connected to the source region of the semiconductor layer 113 via a contact hole 100CH7 in the first protective film 116. Here, not the two contact holes 100CH6 and 100CH7 as shown in FIG. 6 and FIG. 7A are formed, but one contact hole may be formed to overlap both the data line 101 and the source region of the semiconductor layer 113.

As shown in FIG. 6 and FIG. 7A, each pixel electrode 118 is connected to the drain region of the semiconductor layer 113 via a contact hole 100CH8 in the first protective film 116. The pixel electrode 118 may be connected to the drain region of the semiconductor layer 113 via a connection electrode 117B in the third line layer 117. Although some production processes may expose the surface of the drain region of the semiconductor layer 113 to etching environment without the connection electrode 117B constituting the pattern of the third line layer 117, the connection electrode 117B, when disposed, can reduce such a disadvantage.

The counter substrate 1B includes, sequentially toward the liquid crystal layer, an insulating substrate (not shown), a black matrix layer 121, and a color filter layer (not shown). The light-shielding region with the black matrix layer 121 disposed therein is provided with spacers SP which maintain the cell gap to the given thickness. The color filter layer includes red color filters, green color filters, and blue color filters, and has a structure in which these color filters are partitioned by the black matrix layer 121.

The insulating substrate 110 is a substrate having insulation properties. Examples of the insulating substrate 110 include transparent substrates such as glass substrates and plastic substrates.

The conductive lines and electrodes in the first line layer 111, the second line layer 115, and the third line layer 117 can be formed by forming a single-layer or multi-layer film from a metal such as copper, titanium, aluminum, molybdenum, or tungsten, or an alloy thereof by a method such as sputtering, and then patterning the film by a method such as photolithography.

The semiconductor layer 113 can be formed from an oxide semiconductor, such as an InGaZnO-based oxide semiconductor.

The lower layer insulating film 112, the gate insulating film 114, the first protective film 116, and the second protective film 119 can each be an inorganic insulating film, an organic insulating film, or a stack of an organic insulating film and an inorganic insulating film. The inorganic insulating film can be, for example, an inorganic film such as a silicon nitride ($SiN_x$) or silicon oxide ($SiO_2$) film, or a laminate of such films. The organic insulating film can be, for example, a photosensitive organic film such as a photosensitive acrylic resin film.

In the present embodiment, the lower layer insulating film 112, the gate insulating film 114, and the second protective film 119 are each an inorganic insulating film, and the first protective film 116 is a stack of the inorganic insulating film 116A and the photosensitive organic film (organic insulating film) 116B. Specifically, the lower layer insulating film 112 is a stack sequentially including a $SiN_x$ layer and a $SiO_2$ layer from the insulating substrate 110 side, the gate insulating film 114 is a stack sequentially including a $SiO_2$ layer and a $SiN_x$ layer from the insulating substrate 110 side, the first protective film 116 is a stack sequentially including a $SiO_2$ layer, a $SiN_x$ layer, a photosensitive organic film from the insulating substrate 110 side, and the second protective film 119 is a $SiN_x$ layer.

The pixel electrodes 118 and the TP electrodes 11TE each can be formed by, for example, forming a single-layer or multiple-layer film from a transparent conductive material such as indium tin oxide (ITO), indium zinc oxide (IZO), zinc oxide (ZnO), or tin oxide (SnO), or an alloy thereof by a method such as sputtering, and then patterning the film by photolithography.

Figure 8:
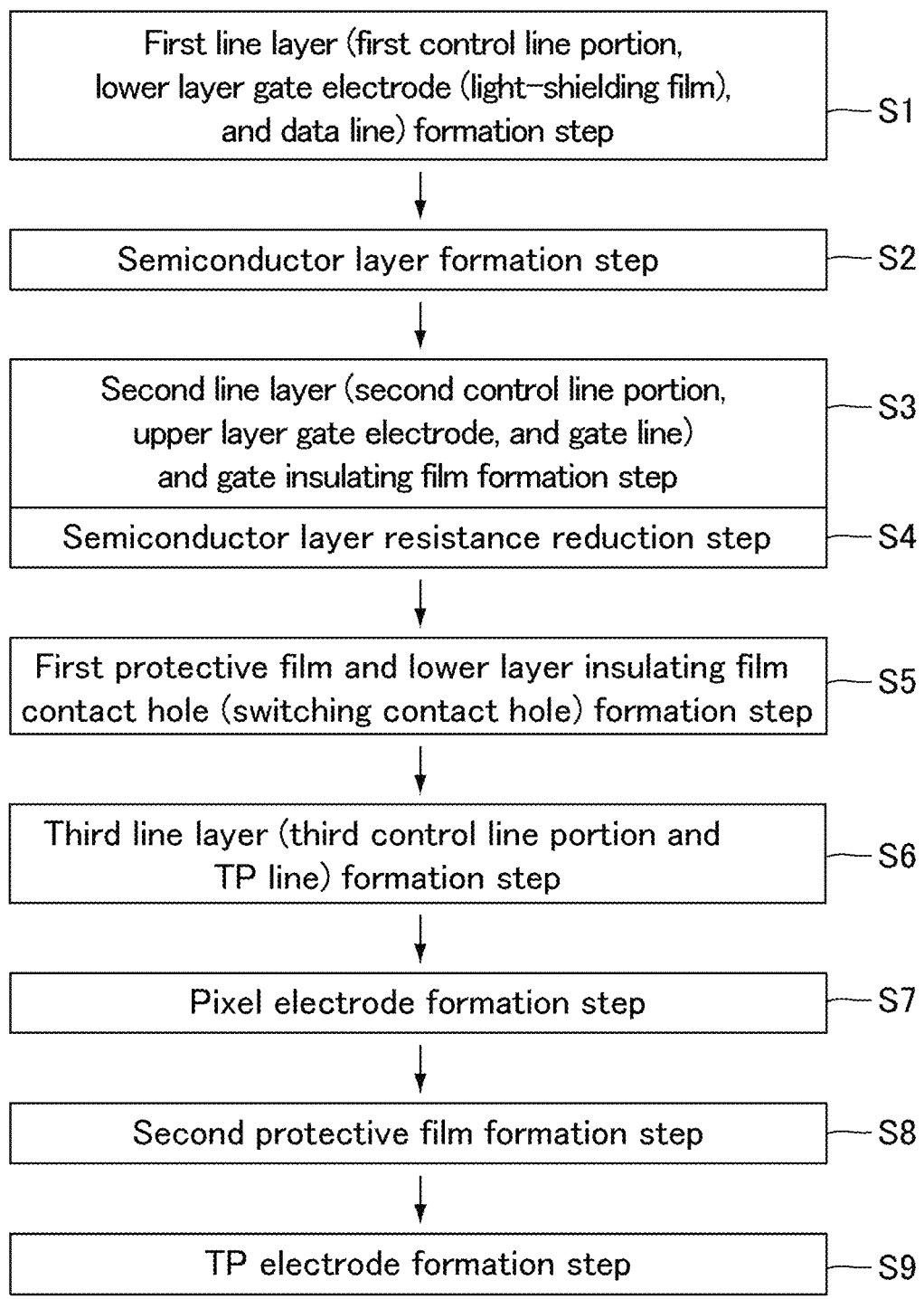
FIG. 8 is a flowchart showing a production process of the TFT substrate in the liquid crystal display device of Embodiment 1.

FIG. 8 is a flowchart showing a production process of the TFT substrate in the liquid crystal display device of Embodiment 1. The production process of the liquid crystal display device 1 of the present embodiment is described with reference to FIG. 8.

In a first line layer (first control line portion, lower layer gate electrode (light-shielding film), and data line) formation step S1, a first conductive film is formed on an insulating substrate by sputtering, and a resist pattern is formed by photolithography using a photomask. The first conductive film is patterned by etching using the resist pattern as a mask. The resist pattern is then removed, so that the first line layer 111 including the first control line portion 211, the lower layer gate electrodes 103G1 (light-shielding film), and the data lines 101 is formed.

In a semiconductor layer formation step S2, the lower layer insulating film 112 is formed on the first line layer 111 by chemical vapor deposition (CVD), a semiconductor film is formed by sputtering, and a resist pattern is formed by photolithography using a photomask. The semiconductor film is patterned by etching using the resist pattern as a mask. The resist pattern is then removed, so that the lower layer insulating film 112 and the semiconductor layer 113 are formed.

In a second line layer (second control line portion, upper layer gate electrode, and gate line) and gate insulating film formation step S3, the gate insulating film 114 is formed on the semiconductor layer 113 by CVD, a second conductive film is formed by sputtering, and a resist pattern is formed by photolithography using a photomask. The second conductive film is patterned by etching using the resist pattern as a mask, so that the second line layer 115 including the second control line portion 212, the upper layer gate electrodes 103G2, and the gate lines 102 is formed. The gate insulating film 114 is patterned by etching also using the above resist pattern, followed by removal of the resist pattern. In this manner, in the production process of the present embodiment, formation of the second line layer 115 and patterning of the gate insulating film 114 can be performed in the same step. Also in the present embodiment, the second line layer 115 including the upper layer gate electrodes 103G2 and the gate insulating film 114 are formed to have substantially the same planar shape.

In a semiconductor layer resistance reduction step S4, the semiconductor layer 113 is subjected to the resistance reduction treatment using the upper layer gate electrodes 103G2 and the gate insulating film 114 overlapping the upper layer gate electrodes 103G2 as masks to form conductivity imparted portions 113A (source regions and drain regions). The TFTs (peripheral TFTs 103N and pixel TFTs 103A) in the present embodiment are assumed to, but not limited to, have a self-alignment structure in which the semiconductor layer 113 is subjected to the resistance reduction treatment using the upper layer gate electrodes 103G2 and the gate insulating film 114 as masks.

In a first protective film and lower layer insulating film contact hole (switching contact hole) formation step S5, the inorganic insulating film 116A is formed on the second line layer 115 by CVD. A photosensitive organic film material is applied to the inorganic insulating film 116A by spin coating or slit coating, and the material is patterned by photolithography using a photomask, so that the photosensitive organic film 116B is formed. The inorganic insulating film 116A is etched using the pattern of the photosensitive organic film 116B to form contact holes in the inorganic insulating film 116A, and then the lower layer insulating film 112 is etched also using the pattern of the photosensitive organic film 116B to form contact holes in the lower layer insulating film 112.

In a third line layer (third control line portion and TP line) formation step S6, a third conductive film is formed on the photosensitive organic film 116B by sputtering, and a resist pattern is formed by photolithography using a photomask. The third conductive film is patterned by etching using the resist pattern as a mask. The resist pattern is then removed, so that the third line layer 117 including the third control line portion 213 and the TP line 11TL is formed.

In a pixel electrode formation step S7, a first transparent conductive film is formed on the third line layer 117 by sputtering, and a resist pattern is formed by photolithography using a photomask. The first transparent conductive film is patterned by etching using the resist pattern as a mask. The resist pattern is then removed, so that the pixel electrodes 118 are formed.

In a second protective film formation step S8, the second protective film 119 is formed on the pixel electrodes 118 by CVD, and a resist pattern is formed by photolithography using a photomask. The second protective film 119 is patterned by etching using the resist pattern as a mask, so that contact holes are formed in the second protective film 119.

In a TP electrode formation step S9, a second transparent conductive film is formed on the second protective film 119 by sputtering, and a resist pattern is formed by photolithography using a photomask. The second transparent conductive film is patterned by etching using the resist pattern as a mask. The resist pattern is then removed, so that the TP electrodes 11TE are formed.

In the production process of the liquid crystal display device 1 of the present embodiment, as described for the second line layer (second control line portion, upper layer gate electrode, and gate line) and gate insulating film formation step S3 in FIG. 8, the gate insulating film 114 can be patterned in the same step as the step of forming the second line layer 115. Also, as described for the first protective film and lower layer insulating film contact hole (switching contact hole) formation step S5 in FIG. 8, contact holes in the inorganic insulating film 116A can be formed by etching the inorganic insulating film 116A of the first protective film 116 using the pattern of the photosensitive organic film 116B of the first protective film 116 prior to the formation of contact holes in the lower layer insulating film 112 by etching the lower layer insulating film 112 also using the pattern of the photosensitive organic film 116B. This eliminates the specialized photolithography steps (photomasks) to form contact holes at least in the lower layer insulating film 112 and the gate insulating film 114. Also, contact holes in the lower layer insulating film 112 can be formed without fail.

Furthermore, in the semiconductor layer resistance reduction step S4, the conductivity imparted portions 113A are formed by the resistance reduction treatment on the semiconductor layer 113 using the gate insulating film 114 and the upper layer gate electrodes 103G2 as masks. Here, the gate insulating film 114 and the upper layer gate electrodes 103G2 can be patterned in the same step (second line layer (second control line portion, upper layer gate electrode, and gate line) and gate insulating film formation step S3), and TFTs (double gate structure TFTs) in which gate electrodes are formed in the upper and lower layers of the channel region can be produced, whereby TFTs can exhibit stable performance in the on and off states.

Embodiment 2

In the present embodiment, features unique to the present embodiment are mainly described, and the same features as those in the above embodiment are not described again. The liquid crystal display device of the present embodiment is assumed to be a FFS mode liquid crystal display device as in the above embodiment. Described in Embodiment 1 is a structure where one common signal line is disposed and the conductive lines are TP lines. Described in the present embodiment is a structure where multiple common signal lines are disposed and the conductive lines are inspection lines.

Figure 9:
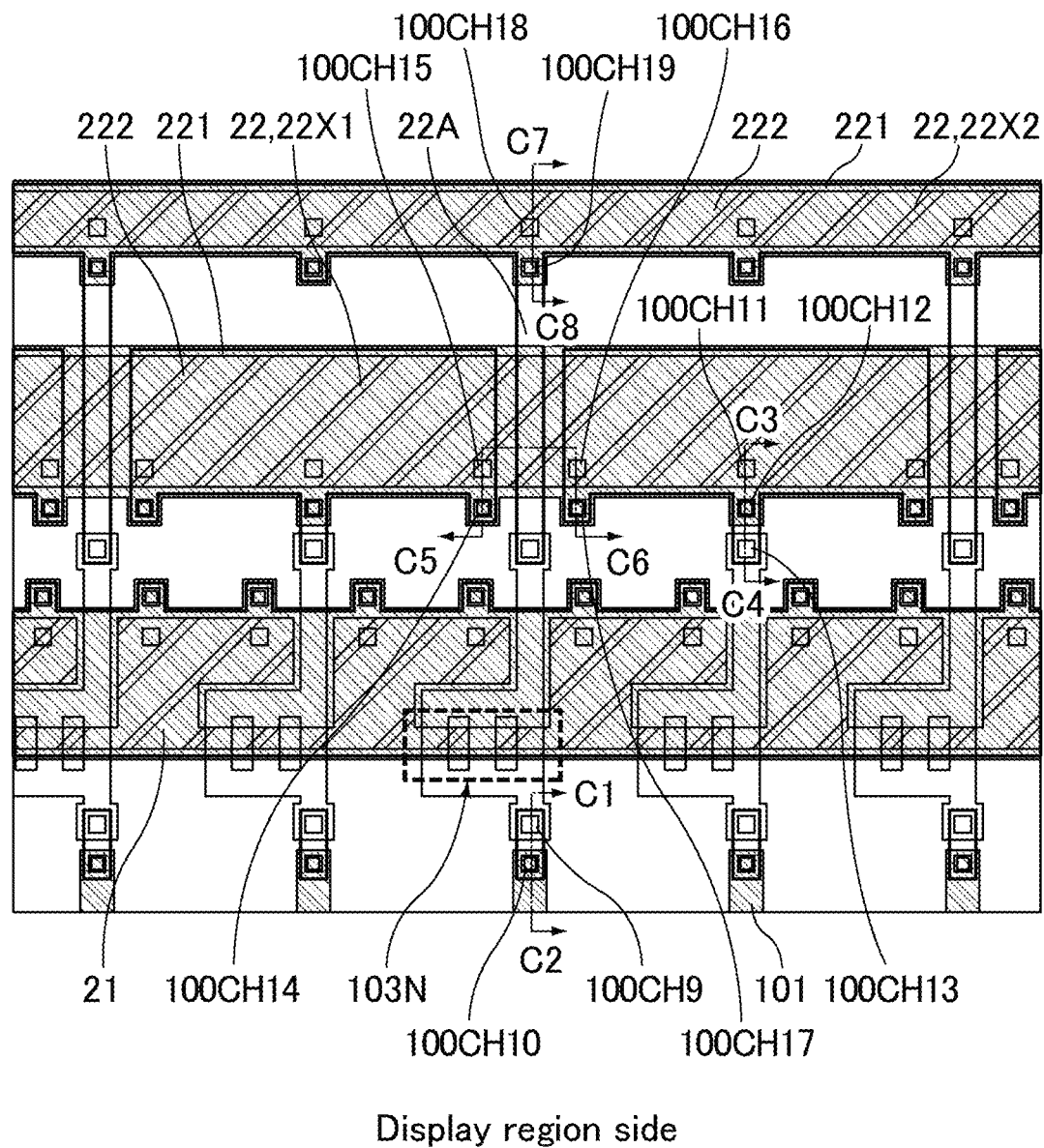
FIG. 9 is a schematic plan view of a liquid crystal display device of Embodiment 2, with a first line layer and a second line layer highlighted.
Figure 10:
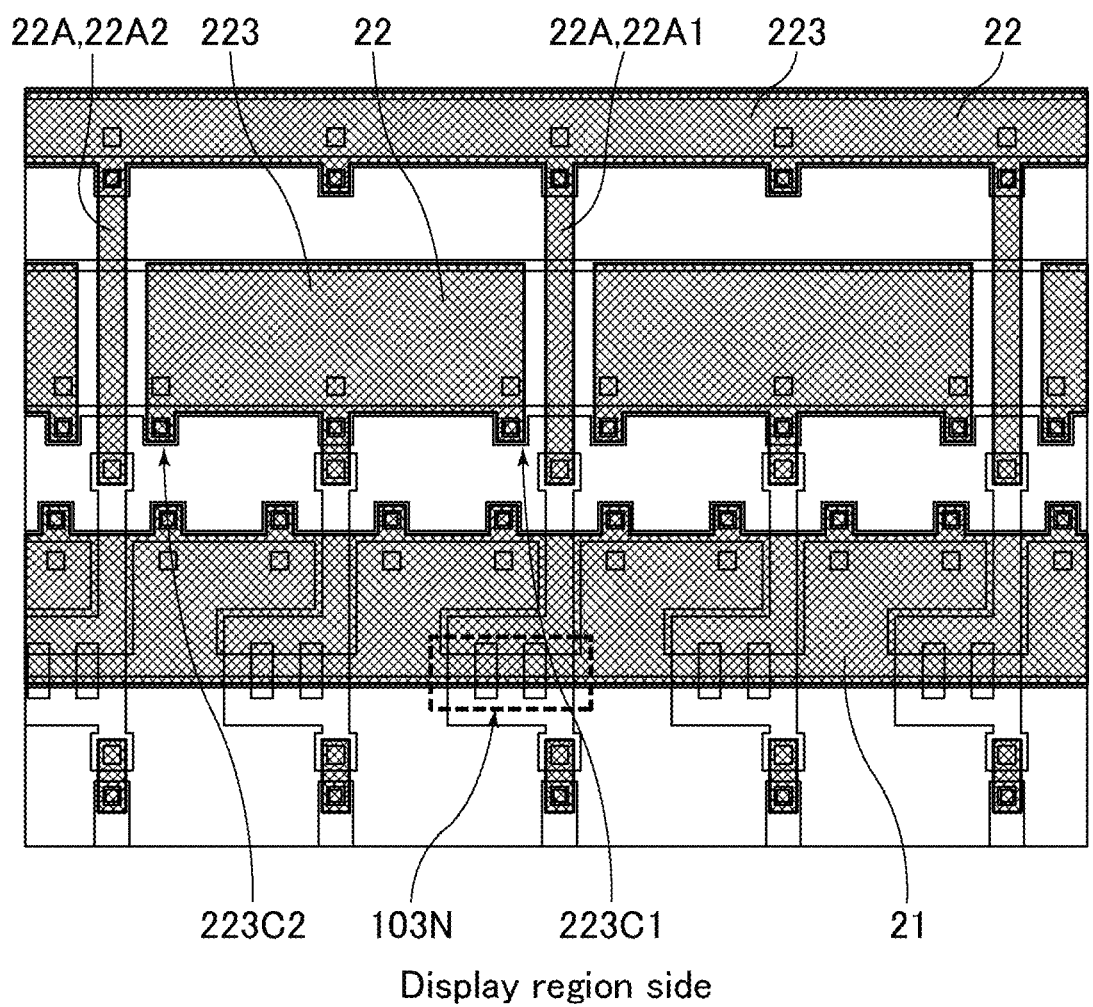
FIG. 10 is another schematic plan view of the liquid crystal display device of Embodiment 2, with a third line layer highlighted.

FIG. 9 is a schematic plan view of a liquid crystal display device of Embodiment 2, with a first line layer and a second line layer highlighted. FIG. 10 is a schematic plan view of the liquid crystal display device of Embodiment 2, with a third line layer highlighted. FIG. 11A to FIG. 11D are schematic cross-sectional views of a TFT substrate in the liquid crystal display device of Embodiment 2. FIG. 11A to FIG. 11D show cross sections taken along the line C1-C2, the line C3-C4, the line C5-C6, and the line C7-C8 in FIG. 9, respectively.

As shown in FIG. 9 and FIG. 10, the TFT substrate 1A in the present embodiment includes a plurality of the common signal lines 22 each including the first common signal line portion 221 in the first line layer 111, the second common signal line portion 222 in the second line layer 115, and the third common signal line portions 223 in the third line layer 117. The common signal lines 22 are disposed in parallel in a region farther from the display region AA than the peripheral TFTs 103N. Each peripheral TFT 103N is connected to any of the common signal lines 22. Each common signal line 22 includes a common signal line 22 closest to the display region AA and at least one common signal line 22 having branch lines 22A, each of the branch lines 22A intersecting one or more common signal lines 22 closer to the display region AA than the common signal line 22 from which the branch lines 22A extend, and each branch lines 22 is connected to any of the peripheral TFTs 103N.

Each peripheral TFT 103N is connected to any of the common signal lines 22 via the corresponding branch line 22A. In other words, when the peripheral TFTs 103N are split into TFT groups each consisting of the same number of adjacent peripheral TFTs 103N as the number of the common signal lines 22, the common signal lines 22 are connected one by one to the peripheral TFTs 103N in each TFT group. In each TFT group, which peripheral TFT 103N is connected to which common signal line 22 can be appropriately set. Still, as shown in FIG. 9 and FIG. 10, the connection relation between the peripheral TFTs 103N and the corresponding common signal lines 22 may be common to all the TFT groups. In other words, the peripheral TFTs 103N are connected to the common signal lines 22 with periodicity when all the peripheral TFTs 103N are viewed from one endmost peripheral TFT 103N toward the other endmost peripheral TFT 103N. For example, as shown in FIG. 9 and FIG. 10, a first common signal line 22X1 may be disposed closest to the display region AA, a second common signal line 22X2 may be disposed farther from the display region AA than the first common signal line 22X1, and the peripheral TFT 103N connected to the first common signal line 22X1 and the peripheral TFT 103N connected to the second common signal line 22X2 may be alternately disposed. This structure in which adjacent peripheral TFTs 103N are connected to different common signal lines 22 can input different signals to two adjacent conductive lines. This enables detection of short circuit of two adjacent conductive lines. Described in the present embodiment is the case where the number of the common signal lines 22 is two. For example, in the case where the first, second, and third common signal lines 22 are disposed in the stated order from the display region AA side, the peripheral TFT 103N connected to the first common signal line 22, the peripheral TFT 103N connected to the second common signal line 22, and the peripheral TFT 103N connected to the third common signal line 22 may be disposed in a predetermined order.

The conductive lines may be the TP lines 11TL as in Embodiment 1 or may be the data lines 101. This structure allows the conductive lines to be used as inspection lines for the TP lines 11TL or for the data lines 101. When the conductive lines are inspection lines for inspection of the TP lines 11TL, the peripheral TFTs 103N are connected to the TP lines 11TL in the third line layer 117 as in Embodiment 1. When the conductive lines are inspection lines for inspection of the data lines 101, the peripheral TFTs 103N are connected to the data lines 101 in the second line layer 115 as shown in FIG. 9 and FIG. 10.

The inspection lines are used to inspect the data lines 101 or the TP lines 11TL for open circuits or the pixel TFTs 103A for defects in the panel production, for example, after the TFT substrate 1A and the counter substrate 1B are bonded to each other with a liquid crystal material (liquid crystal layer) in between.

To perform inspection, a predetermined signal (e.g., voltage for white display, black display, or half-tone display) is input to the common signal lines (inspection signal lines) 22. In the case of final products, a constant potential (e.g., common voltage applied to the TP electrodes 11TE during the writing period or voltage at the center of amplitude of signals input to the data lines 101) is input, for example. Further, in the case of final products, a signal that turns the peripheral TFTs 103N off is input to the control lines 21. Here, when no predetermined signal is input to the common signal lines 22 and the common signal lines 22 are in a floating state, the potentials of the common signal lines 22 may fluctuate during actual driving due to a capacitance formed with other conductive lines or an influence from the outside of the panel. In particular, when the potentials of the common signal lines 22 shift to the low potential side, the leak current increases even when the peripheral TFTs 103N are in the off state, which may cause display failure. For this reason, a constant potential is input to the common signal lines 22 in the case of final products.

As shown in FIG. 9 and FIG. 10, the branch lines 22A are in the third line layer 117, the third common signal line portions 223 in each of the one or more common signal lines 22 intersecting the branch lines 22A are each disposed in a region between two adjacent branch lines 22A (branch line 22A1 and branch line 22A2), the first common signal line portion 221 and the second common signal line portion 222 in each of the one or more common signal lines 22 intersecting the branch lines 22A are connected to each other via each third common signal line portion 223 at an end portion 223C1 and an end portion 223C2 of the third common signal line portion 223. This structure can reduce the width of each inspection line, and thus can achieve a reduced frame region even when the inspection lines are formed.

As shown in FIG. 9 and FIG. 10, the first, second, and third common signal line portions 221, 222, and 223 in the common signal line 22 (second common signal line 22X2) that is farthest from the display region AA are each composed of a single conductive line and overlap each other. On the other hand, the first and second common signal line portions 221 and 222 in the common signal line 22 (first common signal line 22X1) that is closer to the display region AA than the common signal line 22X2 that is farthest from the display region AA are each composed of a single conductive line, while the third common signal line portions 223 in the first common signal line 22X1 are disposed in an island pattern with each portion placed between two adjacent branch lines 22A. The first, second, and third common signal line portions 221, 222, and 223 in the first common signal line 22X1 overlap each other.

Figure 11A:
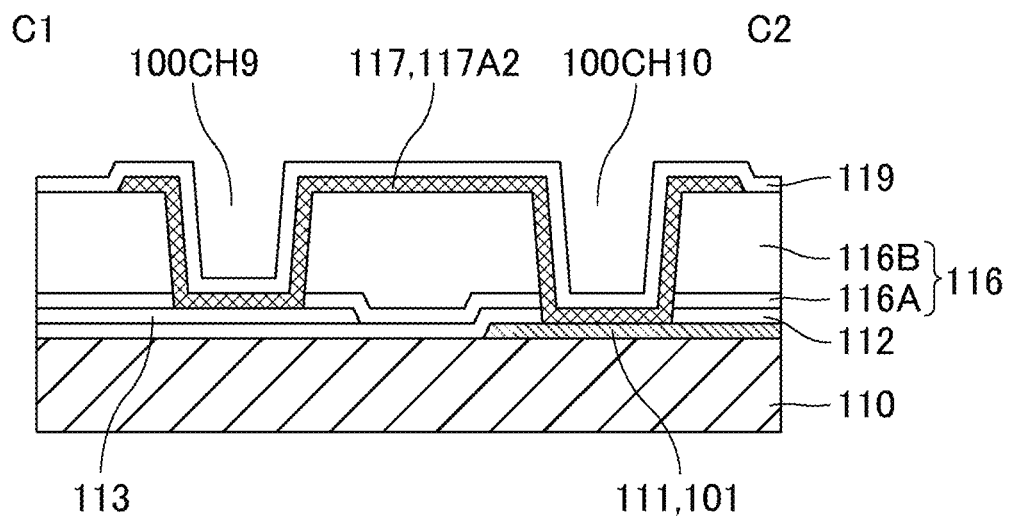
FIG. 11A is a schematic cross-sectional view of a TFT substrate in the liquid crystal display device of Embodiment 2.

As shown in FIG. 11A, the drain region of the semiconductor layer 113 is connected to a switching electrode 117A2 in the third line layer 117 via a contact hole 100CH9 formed in the corresponding first protective film 116, and each data line 101 in the first line layer 111 is connected to the switching electrode 117A2 via a contact hole 100CH10 formed in the lower layer insulating film 112 and the first protective film 116. In other words, the drain region of the semiconductor layer 113 and the data line 101 are connected to each other via the switching electrode 117A2. Here, not the two contact holes 100CH9 and 100CH10 as shown in FIG. 11A are formed, but one contact hole may be formed to overlap the drain region of the semiconductor layer and the data line 101.

Figure 11B:
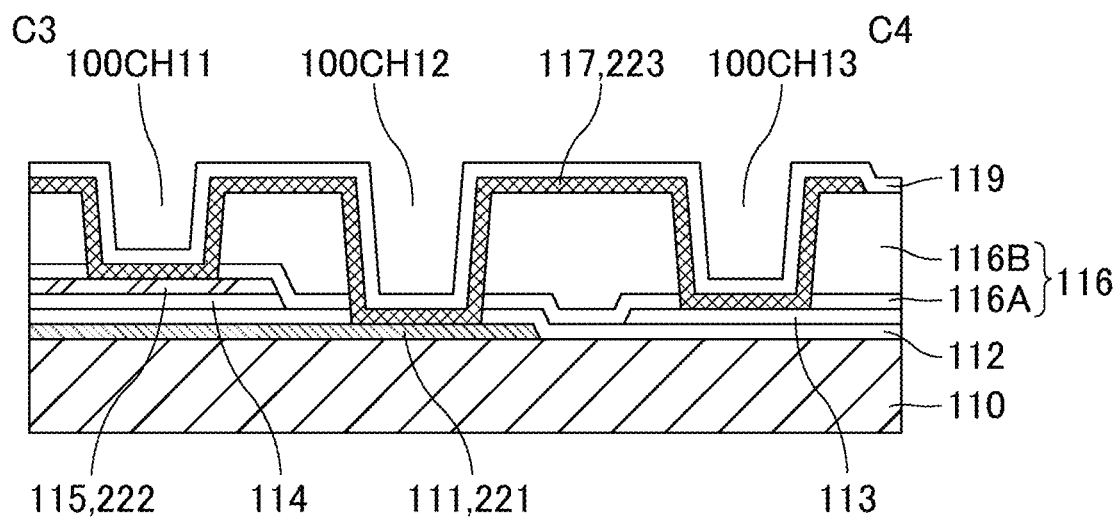
FIG. 11B is another schematic cross-sectional view of the TFT substrate in the liquid crystal display device of Embodiment 2.

As shown in FIG. 11B, the second common signal line portion 222 and each third common signal line portion 223 are connected to each other via a contact hole 100CH11 formed in the first protective film 116. The first common signal line portion 221 and the third common signal line portion 223 are connected to each other via a contact hole 100CH12 formed in the lower layer insulating film 112 and the first protective film 116. The third common signal line portion 223 is connected to the source region of the corresponding semiconductor layer 113 via a contact hole 100CH13 in the first protective film 116. Here, not the three contact holes 100CH11, 100CH12, and 100CH13 as shown in FIG. 11B are formed, but one contact hole may be formed to overlap the first common signal line portion 221, the second common signal line portion 222, and the source region of the semiconductor layer 113.

As shown in FIG. 11C, on one side of each branch line 22A, the first common signal line portion 221 and the third common signal line portion 223 are connected to each other via a contact hole 100CH14 formed in the lower layer insulating film 112 and the first protective film 116, and the second common signal line portion 222 and the third common signal line portion 223 are connected to each other via a contact hole 100CH15 formed in the first protective film 116. On the other side of the branch line 22A, the second common signal line portion 222 and the third common signal line portion 223 are connected to each other via a contact hole 100CH16 formed in the first protective film 116, and the first common signal line portion 221 and the third common signal line portion 223 are connected to each other via a contact hole 100CH17 formed in the lower layer insulating film 112 and the first protective film 116. Here, not the two contact holes 100CH14 and 100CH15 are formed, but one contact hole may be formed to overlap the first common signal line portion 221 and the second common signal line portion 222. Also, not the two contact holes 100CH16 and 100CH17 are formed, but one contact hole may be formed to overlap the first common signal line portion 221 and the second common signal line portion 222.

Figure 11D:
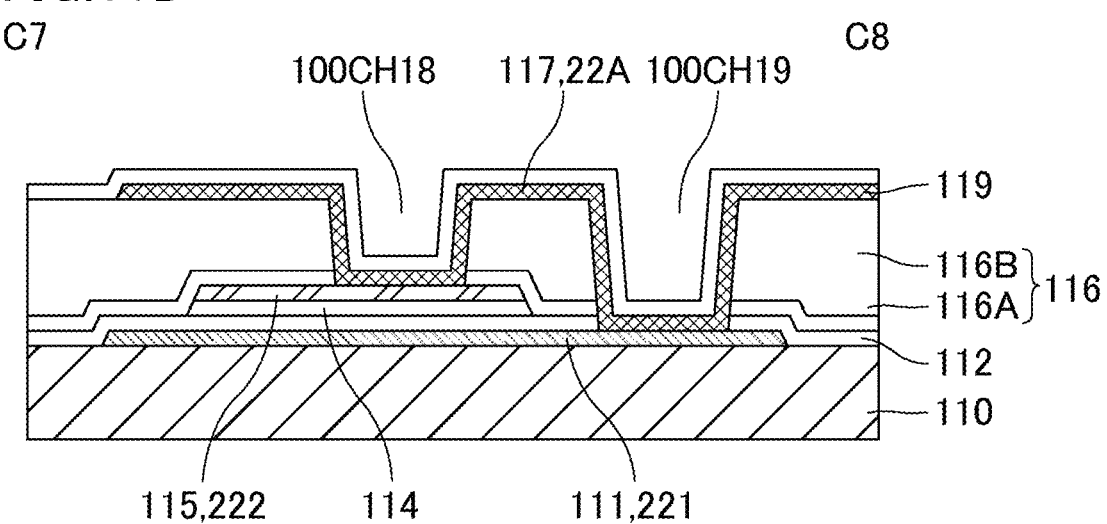
FIG. 11D is yet another schematic cross-sectional view of the TFT substrate in the liquid crystal display device of Embodiment 2.

As shown in FIG. 11D, the second common signal line portion 222 and each third common signal line portion 223 are connected to each other via a contact hole 100CH18 formed in the first protective film 116. The first common signal line portion 221 and the third common signal line portion 223 are connected to each other via a contact hole 100CH19 formed in the lower layer insulating film 112 and the first protective film 116. The third common signal line portion 223 is connected to the corresponding branch line 22A extending toward the display region AA. Here, not the two contact holes 100CH18 and 100CH19 are formed, but one contact hole may be formed to overlap the first common signal line portion 221 and second common signal line portion 222.

The present embodiment is described by taking a FFS mode liquid crystal display device as an example. When the conductive lines are inspection lines for inspection of the data lines 101, the liquid crystal display device of the present embodiment may not have to be an in-cell TP liquid crystal display device or a FFS mode liquid crystal display device. In other words, the concept of the present embodiment is applicable to a twisted nematic (TN) mode liquid crystal display device and a vertical alignment (VA) mode liquid crystal display device.

In the TN mode liquid crystal display device, the pixel electrodes are disposed on the TFT substrate 1A, the common electrode is disposed on the counter substrate 1B, and in the liquid crystal layer, liquid crystal molecules are aligned such that the alignment azimuth is twisted by 90° in one rotational direction from the pixel electrode side to the common electrode side.

In the VA mode liquid crystal display device, the pixel electrodes are disposed on the TFT substrate 1A, the common electrode is disposed on the counter substrate 1B, and negative liquid crystal molecules are aligned perpendicular to the substrate surfaces in the liquid crystal layer with no voltage applied between the pixel electrodes and the common electrode.

When the concept of the present embodiment is applied to a liquid crystal display device not including an in-cell TP, the third line layer 17 where the TP lines 11TL are to be formed may be replaced by a conductive line layer that narrows the resistance distribution of the common electrode or the auxiliary capacitor counter electrode (transparent electrode that forms auxiliary capacitance with the pixel electrodes) in the display region AA.

Embodiment 3

In the present embodiment, features unique to the present embodiment are mainly described, and the same features as those in the above embodiments are not described again. The liquid crystal display device of the present embodiment is assumed to be a FFS mode liquid crystal display device as in Embodiment 1. Described in Embodiment 1 is a structure including the driver 12 for both data signals and touch sensors and the FPC 13 disposed in one side area of the frame region NA and the gate drive circuit 14 is monolithically formed in each of two side areas of the frame region NA. In the present embodiment, the driver 12 for both data signals and touch sensors and the FPC 13 are disposed in one side area of the frame region NA, and a gate driver is mounted in another side area of the frame region NA.

Figure 12:
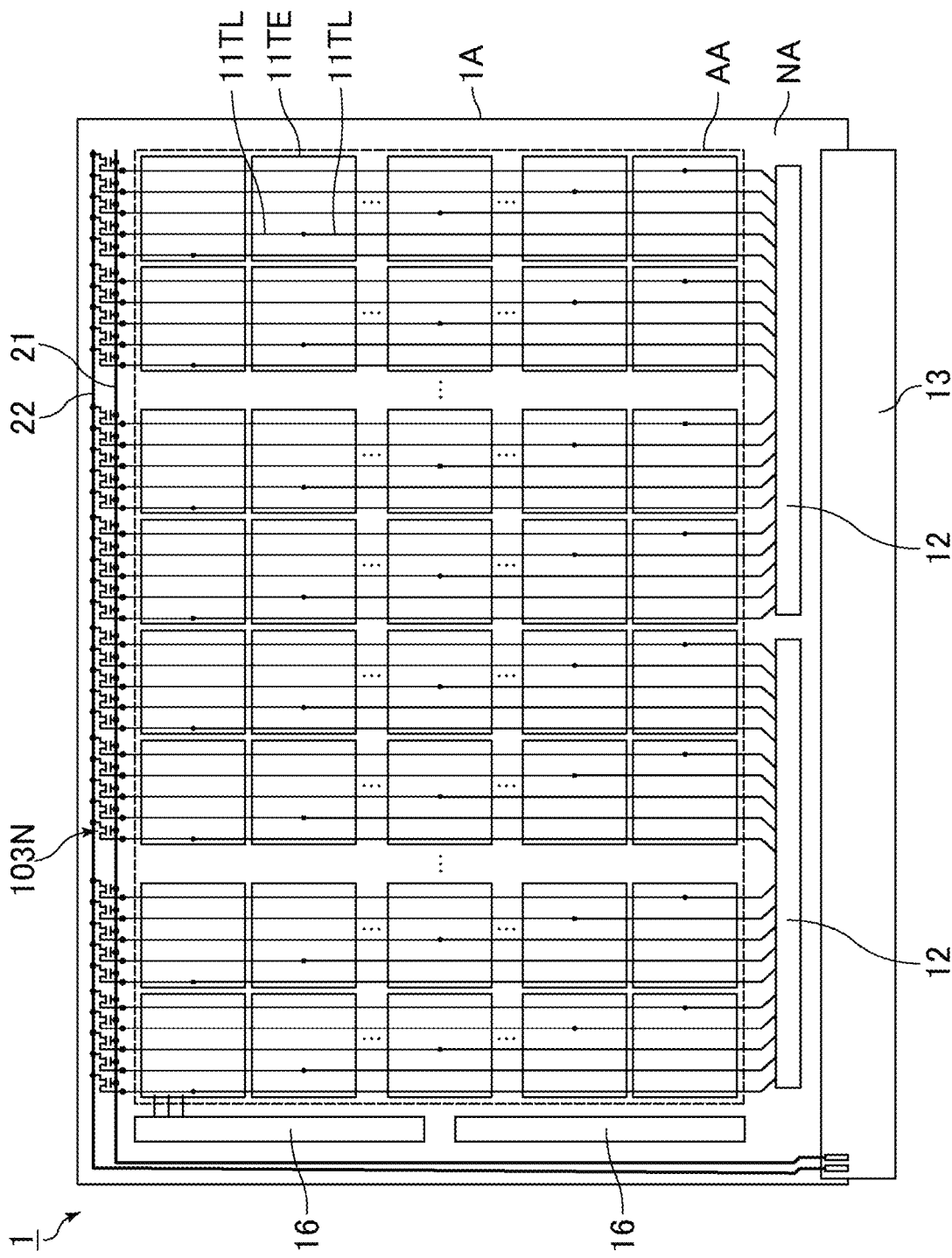
FIG. 12 is a schematic plan view of a liquid crystal display device of Embodiment 3.

FIG. 12 is a schematic plan view of a liquid crystal display device of Embodiment 3. As shown in FIG. 12, the liquid crystal display device 1 of the present embodiment includes two drivers 12 each for both data signals and touch sensors in the lower area of the frame region NA and two gate drivers 16 in the left area of the frame region NA.

In Embodiment 1, the driver 12 for both data signals and touch sensors and the FPC 13 are mounted only in one side area of the frame region NA, and the gate drive circuit is monolithically formed on the TFT substrate 1A (gate driver monolithic (GDM)). This structure can achieve a reduced frame region in the left, right, and upper areas of the frame region NA. Even in the case of the present embodiment in which not the GDM structure is formed but the drivers are mounted on two side areas of the frame region NA, a reduced frame region can be achieved in at least the upper and left areas of the frame region NA.

Modified Example of Embodiments 1 to 3

Figure 13:
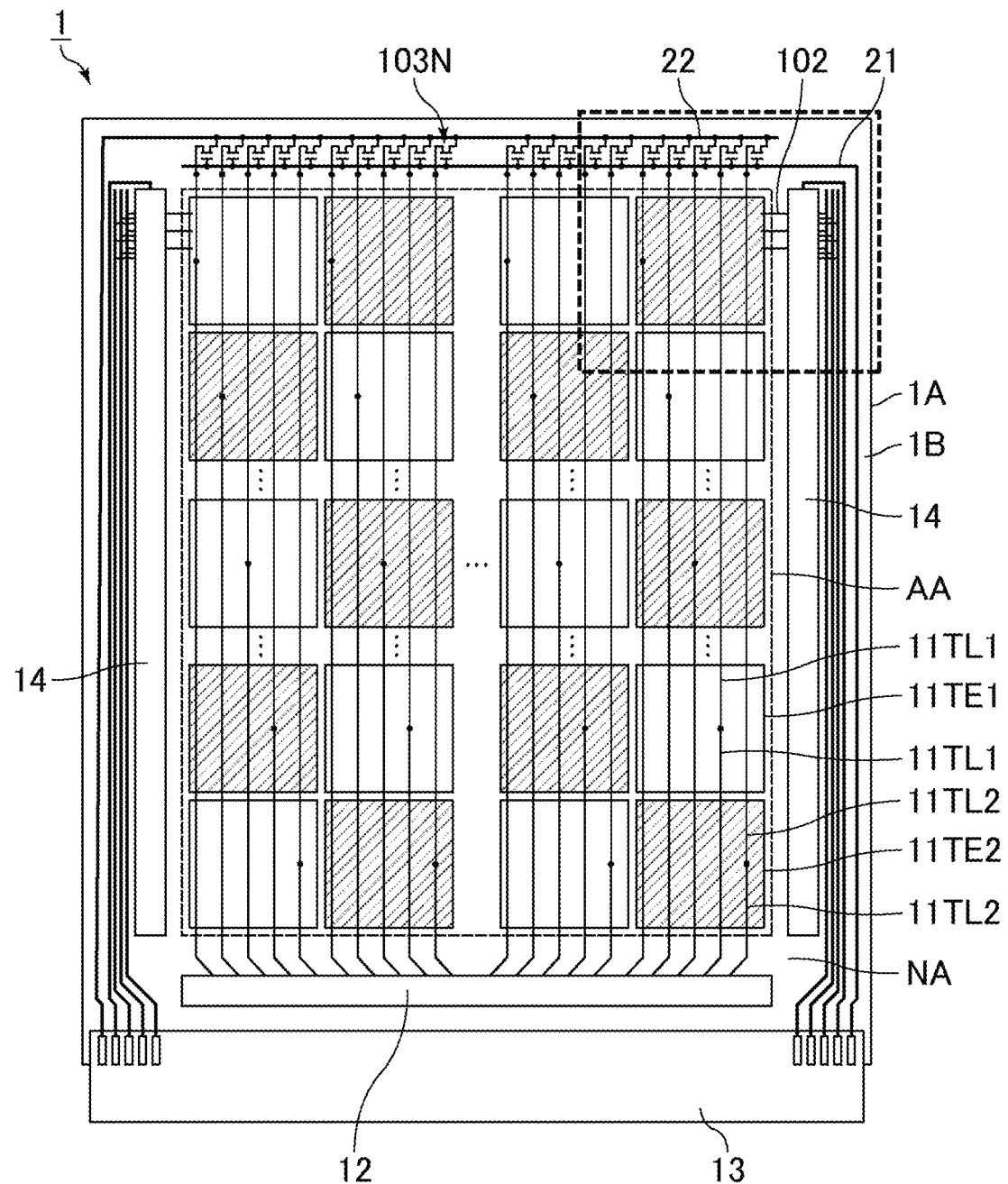
FIG. 13 is a schematic plan view of a liquid crystal display device of a modified example of Embodiments 1 to 3.
Figure 14:
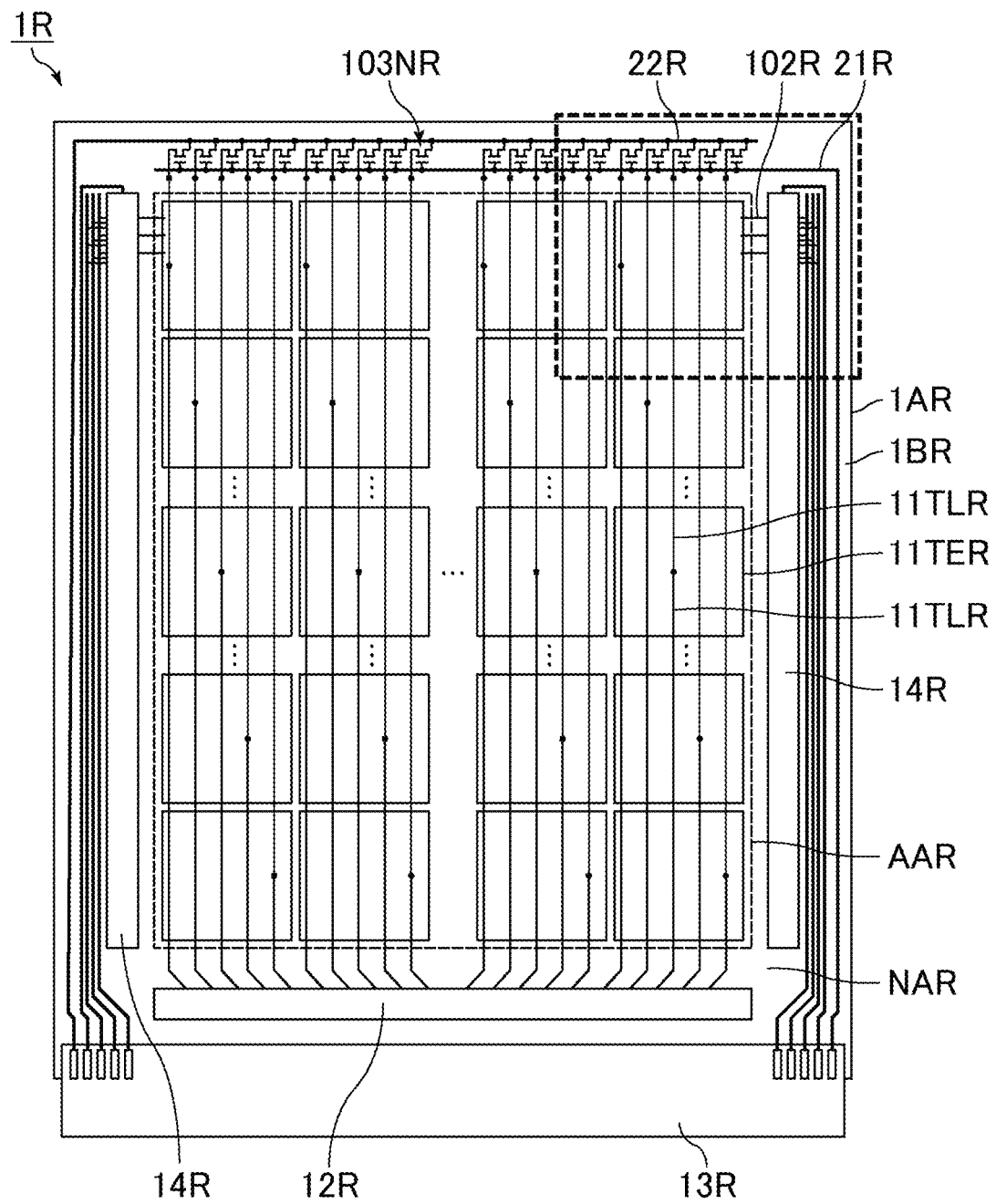
FIG. 14 is a schematic plan view of a liquid crystal display device of Comparative Embodiment 1.
Figure 15:
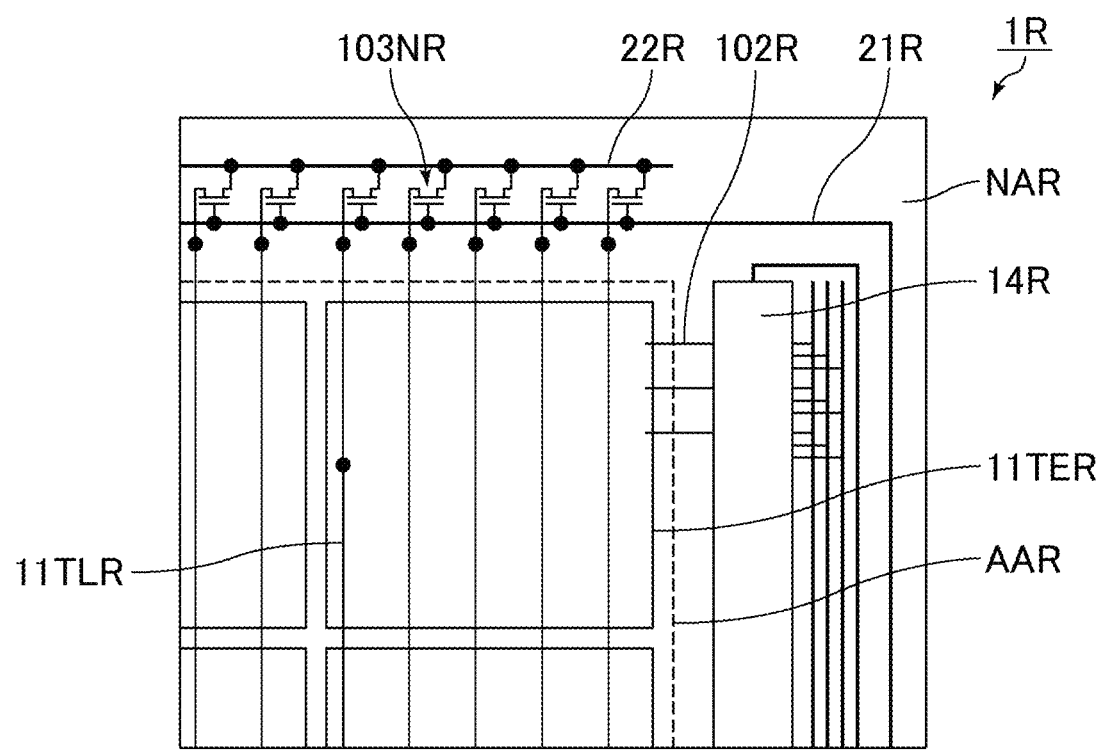
FIG. 15 is an enlarged schematic plan view of the region surrounded by the dashed line in FIG. 14.

Although the case of a self-capacitance touch sensor is described in the above embodiments, the touch sensor may be a mutual capacitance touch sensor. FIG. 13 is a schematic plan view of a liquid crystal display device of a modified example of Embodiments 1 to 3. In the liquid crystal display device 1 of the modified example of Embodiments 1 to 3, some of the TP electrodes 11TE in each of the liquid crystal display devices 1 of Embodiments 1 to 3 are used as scanning electrodes 11TE1 and the rest of the TP electrodes 11TE are used as sensing electrodes 11TE2. The liquid crystal display device 1 of the modified example of Embodiments 1 to 3 includes a mutual capacitance touch sensor.

As shown in FIG. 13, the liquid crystal display device 1 of the modified example of Embodiments 1 to 3 includes the scanning electrodes 11TE1 and the sensing electrodes 11TE2. The scanning electrodes 11TE1 are connected to scanning electrode TP lines 11TL1 and the sensing electrodes 11TE2 are connected to sensing electrode TP lines 11TL2. The scanning electrode 11TE1 and the sensing electrode 11TE2 are alternately arranged along the direction in which the scanning electrode TP lines 11TL1 and the sensing electrode TP lines 11TL2 extend (column direction). The scanning electrode 11TE1 and the sensing electrode 11TE2 are alternately arranged also along the direction perpendicular to the extension direction of the TP lines 11TL1 and the TP line 11TL2 (row direction). In this structure, each scanning electrode 11TE1 is not adjacent to the other scanning electrodes but adjacent to sensing electrodes 11TE2, and each sensing electrode 11TE2 is not adjacent to the other sensing electrodes but adjacent to the scanning electrodes 11TE1.

The same signals are applied to the scanning electrodes 11TE1 in the same row through the corresponding scanning electrode TP lines 11TL1. Thereby, pulse signals are sequentially applied to the scanning electrodes 11TE1 in the respective rows. Thereafter, a change in capacitance between each scanning electrode 11TE1 and the corresponding sensing electrode 11TE2 is detected by the corresponding sensing electrode TP lines 11TL2. Thereby, whether or not a pointer has been in contact and whether or not the pointer has been in proximity can be determined.

What is claimed is:

1. An image display device comprising:
a substrate;
a display region for displaying an image; and
a frame region which is a peripheral region of the display region,
the substrate including:
an insulating substrate;
on the insulating substrate, a stack sequentially including a first line layer, a first insulating film, a semiconductor layer, a second insulating film, a second line layer, a third insulating film, and a third line layer;
thin-film transistors disposed in the frame region;
a control line disposed in the frame region and connected to a gate electrode of each of the thin-film transistors;
a common signal line disposed in the frame region and connected to one of a source electrode or a drain electrode of each of the thin-film transistors; and
conductive lines each connected to the other of the source electrode or the drain electrode of each of the thin-film transistors and extending from the frame region into the display region,
the control line including a first control line portion in the first line layer, a second control line portion in the second line layer, and a third control line portion in the third line layer.

2. The image display device according to claim 1,
wherein the first control line portion and the second control line portion are connected to each other via the third control line portion.

3. The image display device according to claim 2,
wherein the control line is located to intersect extended lines of the conductive lines,
the first control line portion and the second control line portion are connected to each other via the third control line portion at two or more positions in a region between two extended lines of two adjacent conductive lines.

4. The image display device according to claim 1,
wherein the thin-film transistors each further comprise a channel light-shielding film in the first line layer, and the gate electrode is in the second line layer.

5. The image display device according to claim 1,
wherein the substrate further comprises:
thin-film transistors in the display region; and
gate lines each connected to a gate electrode of each of the thin-film transistors in the display region, and
the conductive lines intersect the gate lines in the display region.

6. The image display device according to claim 5,
wherein the conductive lines are data lines each connected to one of a source electrode or a drain electrode of each of the thin-film transistors in the display region,
the substrate further comprises pixel electrodes, and
the pixel electrodes are each connected to the other of the source electrode or the drain electrode of each of the thin-film transistors in the display region.

7. The image display device according to claim 5,
wherein the substrate further comprises touch panel electrodes in the display region,
the conductive lines are touch panel lines each connected to any of the touch panel electrodes,
during a writing period for writing a display signal to pixels in the display region, the thin-film transistors in the frame region are turned on, and a signal is supplied to each conductive line from each end of the conductive line, and
during a sensing period for detecting at least one of contact or proximity of a pointer with the display region, the thin-film transistors in the frame region are turned off, and a signal is supplied to each conductive line from an end of the conductive line, the end being not connected to any of the thin-film transistors in the frame region.

8. The image display device according to claim 1,
wherein the common signal line includes a first common signal line portion in the first line layer, a second common signal line portion in the second line layer, and a third common signal line portion in the third line layer.

9. The image display device according to claim 8,
wherein the first common signal line portion and the second common signal line portion are connected to each other via the third common signal line portion.

* * * * *